(12) United States Patent
Sato et al.

(10) Patent No.: US 11,506,294 B2
(45) Date of Patent: Nov. 22, 2022

(54) VALVE DEVICE, METHOD FOR REPLACING VALVE BODY UNIT OF VALVE DEVICE, AND VALVE DEVICE ASSEMBLY METHOD

(71) Applicant: FUJIKIN INCORPORATED, Osaka (JP)

(72) Inventors: Hidenobu Sato, Osaka (JP); Kenta Kondo, Osaka (JP); Tomohiro Nakata, Osaka (JP); Masahiko Nakazawa, Osaka (JP); Nobuo Nakamura, Osaka (JP); Tomoko Yuhara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 17/213,882

(22) Filed: Mar. 26, 2021

(65) Prior Publication Data

US 2021/0239222 A1    Aug. 5, 2021

Related U.S. Application Data

(63) Continuation of application No. PCT/JP2019/035458, filed on Sep. 10, 2019.

(30) Foreign Application Priority Data

Sep. 27, 2018  (JP) .............................. JP2018-181749

(51) Int. Cl.
*F16K 7/16*      (2006.01)
*F16K 1/04*      (2006.01)
*F16K 43/00*     (2006.01)

(52) U.S. Cl.
CPC .................. *F16K 7/16* (2013.01); *F16K 1/04* (2013.01); *F16K 43/00* (2013.01)

(58) Field of Classification Search
CPC ........ F16K 41/10; F16K 41/106; F16K 41/12; F16K 1/02; F16K 1/04; F16K 1/48;
(Continued)

(56) References Cited

U.S. PATENT DOCUMENTS 2,352,249 A * 6/1944 Briggs, Jr. .............. F16K 1/485
                                                        251/88
2,355,916 A * 8/1944 Klafstad ................... F16K 1/48
                                                        411/513

(Continued)

FOREIGN PATENT DOCUMENTS

JP    2008032113 A    2/2008
JP    2017516039 A    6/2018

OTHER PUBLICATIONS

International Search Report for International Application PCT/JP2019/035458; dated Dec. 3, 2019.

*Primary Examiner* — Hailey K. Do
(74) *Attorney, Agent, or Firm* — Cantor Colburn LLP

(57) ABSTRACT

A valve body unit is configured to be disengaged from a stem by moving the stem and the valve body unit to a valve seat side in a state where a bonnet is separated from the valve seat, thereby pushing a replacement ring such that the replacement ring moves through the bonnet while decreasing in diameter and then drops down onto a ring dropping portion in the free state, then moving the stem, the valve body unit, and the replacement ring to an opposite side to the valve seat side such that a first surface comes into contact with a second surface and the ring dropping portion comes into contact with the replacement ring, and in this state, moving only the stem to the opposite side to the valve seat side such that the connection formed by a connecting mechanism between the stem connection portion and the stem is released.

9 Claims, 15 Drawing Sheets

(58) Field of Classification Search
CPC . F16K 1/482; F16K 1/485; F16K 1/50; F16K 7/16; Y10T 137/0491; Y10T 137/0519; Y10T 137/6065; Y10T 137/6109
See application file for complete search history.

(56) References Cited

U.S. PATENT DOCUMENTS

| | | | | | |
|---|---|---|---|---|---|
| 2,490,043 | A | * | 12/1949 | Funk | F16K 1/485 251/88 |
| 3,204,925 | A | * | 9/1965 | Montuori | F16K 1/50 251/274 |
| 3,251,575 | A | * | 5/1966 | Campbell | F16K 41/10 251/367 |
| 3,787,023 | A | * | 1/1974 | Shufflebarger | F16K 41/10 251/335.3 |
| 5,992,440 | A | * | 11/1999 | Betz | F16K 31/508 74/25 |
| 2007/0251588 | A1 | * | 11/2007 | Linder | F16K 1/48 137/625.5 |

* cited by examiner

VALVE DEVICE, METHOD FOR REPLACING VALVE BODY UNIT OF VALVE DEVICE, AND VALVE DEVICE ASSEMBLY METHOD

CROSS REFERENCE TO RELATED APPLICATION

This application is a continuation under 35 U.S.C. § 120 of PCT/JP2019/035458, filed Sep. 10, 2019, which is incorporated herein reference and which claimed priority to Japanese Application No. 2018-181749, filed Sep. 27, 2018. The present application likewise claims priority under 35 U.S.C. § 119 to Japanese Application No. 2018-181749, filed Sep. 27, 2018, the entire content of which is also incorporated herein by reference.

TECHNICAL FIELD

The present disclosure relates to a valve device, a method for replacing a valve body unit of the valve device, and a valve device assembly method.

BACKGROUND

A valve device in which a replaceable component unit including a valve body and a diaphragm can be replaced is available (see Japanese Patent Application Publication No. 2008-32113, for example).

SUMMARY

In the valve device of Japanese Patent Application Publication No. 2008-32113, however, in order to attach and detach the replaceable component unit to and from a spindle, the replaceable component unit and the spindle has to be disengaged from a support member, which is extremely laborious.

Therefore, one of the objects of the present disclosure is to provide a technique with which a valve body unit can be replaced easily.

A valve device according to one or more embodiments includes: a valve device body that has a fluid passage and a valve chamber formed therein and includes a valve seat; a tubular bonnet that is connected to the valve device body to be capable of approaching the valve seat and separating from the valve seat; a driving portion that is configured to generate driving force; a stem that is supported by the bonnet and is configured to approach the valve seat and separate from the valve seat upon receipt of the driving force generated by the driving portion to open and close the fluid passage; a valve body unit that is connected to the stem and is configured to open and close the fluid passage by approaching the valve seat and separating from the valve seat; a replacement ring that is provided in the bonnet; and a connecting mechanism that connects the valve body unit to the stem. A connecting hole that opens toward the valve seat is formed in a part of the stem on the valve seat side. The valve body unit includes: a diaphragm that is provided to cover the valve chamber and keeps the valve chamber airtight; a valve body portion that is inserted into a central portion of the diaphragm and is configured to open and close the fluid passage by approaching the valve seat and separating from the valve seat; and a connecting member that includes a stem connection portion connected to the stem and a valve body connection portion connected to the valve body portion, and is inserted into the replacement ring. The stem connection portion of the connecting member is inserted into the connecting hole in the stem and connected to the stem by the connecting mechanism. The valve body portion includes a ring dropping portion on the opposite side of the diaphragm to the valve chamber side. The replacement ring is provided on an inner peripheral surface of the bonnet, and a first surface of the replacement ring on the stem side has a dimension that enables contact with a second surface of the bonnet on the valve seat side when the replacement ring is in a free state. The valve body unit is configured to be disengaged from the stem by moving the stem and the valve body unit to the valve seat side using the driving force generated by the driving portion in a state where the bonnet is separated from the valve seat, thereby pushing the replacement ring such that the replacement ring moves through the bonnet while decreasing in diameter and then drops down onto the ring dropping portion of the valve body unit in the free state, then moving the stem, the valve body unit, and the replacement ring to an opposite side to the valve seat side using the driving force generated by the driving portion such that the first surface of the replacement ring comes into contact with the second surface of the bonnet and the ring dropping portion of the valve body unit comes into contact with the replacement ring, and in this state, moving only the stem to the opposite side to the valve seat side using the driving force generated by the driving portion such that the connection formed by the connecting mechanism between the stem connection portion and the stem is released.

A method for replacing valve body unit of valve device according to one or more embodiments of the present disclosure invention, the valve device includes: a valve device body that has a fluid passage and a valve chamber formed therein and includes a valve seat; a tubular bonnet that is connected to the valve device body to be capable of approaching the valve seat and separating from the valve seat; a driving portion that is configured to generate driving force; a stem that is supported by the bonnet and is configured to approach the valve seat and separate from the valve seat upon receipt of the driving force generated by the driving portion to open and close the fluid passage; a valve body unit that is connected to the stem and is configured to open and close the fluid passage by approaching the valve seat and separating from the valve seat; a replacement ring that is provided in the bonnet; and a connecting mechanism that connects the valve body unit to the stem. A connecting hole that opens toward the valve seat is formed in a part of the stem on the valve seat side. The valve body unit includes: a diaphragm that is provided to cover the valve chamber and keeps the valve chamber airtight; a valve body portion that is inserted into a central portion of the diaphragm and is configured to open and close the fluid passage by approaching the valve seat and separating from the valve seat; and a connecting member that includes a stem connection portion connected to the stem and a valve body connection portion connected to the valve body portion, and is inserted into the replacement ring. The stem connection portion of the connecting member is inserted into the connecting hole in the stem and connected to the stem by the connecting mechanism. The valve body portion includes a ring dropping portion on the opposite side of the diaphragm to the valve chamber side. The replacement ring is provided on an inner peripheral surface of the bonnet, and a first surface of the replacement ring on the stem side has a dimension that enables contact with a second surface of the bonnet on the valve seat side when the replacement ring is in a free state. The method includes: moving the stem and the valve body unit to the valve seat side using the driving force generated by the driving portion in a state where the bonnet is separated from the valve seat, thereby pushing the replacement ring such that the replacement ring moves through the bonnet while decreasing in diameter and then drops down onto the ring dropping portion of the valve body unit in the free state; moving the stem, the valve body unit, and the replacement ring to an opposite side to the valve seat side using the driving force generated by the driving portion such that the first surface of the replacement ring comes into contact with the second surface of the bonnet and the ring dropping portion of the valve body unit comes into contact with the replacement ring; moving only the stem to the opposite side to the valve seat side using the driving force generated by the driving portion such that the connection formed by the connecting mechanism between the stem connection portion and the stem is released and then the valve body unit is disengaged from the stem; and attaching a new valve body unit to the stem by inserting the stem connection portion of the connecting member of the new valve body unit into the connecting hole in the stem.

A valve device assembly method for assembling a valve device according to one or more embodiments, the valve device includes: a valve device body that has a fluid passage and a valve chamber formed therein and includes a valve seat; a tubular bonnet that is connected to the valve device body to be capable of approaching the valve seat and separating from the valve seat; a driving portion that is configured to generate driving force; a stem that is supported by the bonnet and is configured to approach the valve seat and separate from the valve seat upon receipt of the driving force generated by the driving portion to open and close the fluid passage; a valve body unit that is connected to the stem and is configured to open and close the fluid passage by approaching the valve seat and separating from the valve seat; a replacement ring that is provided in the bonnet; and a connecting mechanism that connects the valve body unit to the stem. A connecting hole that opens toward the valve seat is formed in a part of the stem on the valve seat side. The valve body unit includes: a diaphragm that is provided to cover the valve chamber and keeps the valve chamber airtight; a valve body portion that is inserted into a central portion of the diaphragm and is configured to open and close the fluid passage by approaching the valve seat and separating from the valve seat; a connecting member that includes a stem connection portion connected to the stem and a valve body connection portion connected to the valve body portion, and is inserted into the replacement ring; and a retaining adapter configured to compress the diaphragm together with the valve device body. The stem connection portion of the connecting member is inserted into the connecting hole in the stem and connected to the stem by the connecting mechanism. The valve body portion includes a ring dropping portion on the opposite side of the diaphragm to the valve chamber side. The replacement ring is provided on an inner peripheral surface of the bonnet, and a first surface of the replacement ring on the stem side has a dimension that enables contact with a second surface of the bonnet on the valve seat side when the replacement ring is in a free state. A first inclined surface that gradually separates from the valve seat toward the inside thereof is formed on an inner peripheral end of the second surface of the bonnet, and a fitting groove into which the replacement ring is configured to be fitted is formed on an upper side of the first inclined surface of the bonnet. The retaining adapter has a third surface that is configured to contact the second surface and a second inclined surface that is formed on an inner peripheral end of the third surface, inclines relative to an axis of the stem, and gradually approaches the valve seat toward the inside thereof. The replacement ring includes an outer peripheral portion having an arc-shaped cross-section when cut on a plane that includes the axis thereof, an outer diameter of the replacement ring is set to be smaller than an inner diameter of an end portion of the second inclined surface on the third surface side when the replacement ring is in the free state, and the outer peripheral portion is configured to be capable of contacting the second inclined surface. The valve device assembly method includes: bringing the outer peripheral portion of the replacement ring, which is in the free state, into contact with the second inclined surface in a state where the bonnet is separated from the valve seat, causing the bonnet to approach the valve seat such that the replacement ring is compressed between the second surface of the bonnet and the second inclined surface, then causing the replacement ring to decrease in diameter along the second inclined surface until the outer peripheral portion of the replacement ring comes into contact with the first inclined surface, and moving the stem and the valve body unit to the opposite side to the valve seat side using the driving force generated by the driving portion so that the replacement ring moves to the stem side from the ring dropping portion, such that the replacement ring is caused to move along the first inclined surface while decreasing in diameter and the replacement ring is fitted into the fitting groove and then the replacement ring is attached to the bonnet.

A valve device according to one or more embodiments of the present disclosure includes: a valve device body that has a fluid passage and a valve chamber formed therein and includes a valve seat; a tubular bonnet that is detachably provided on the valve device body; a driving portion that is configured to generate driving force; a stem that is supported by the bonnet and is configured to approach the valve seat and separate from the valve seat upon receipt of the driving force generated by the driving portion to open and close the fluid passage; a valve body unit that is connected to the stem and is configured to open and close the fluid passage by approaching the valve seat and separating from the valve seat; a connecting mechanism that connects the valve body unit to the stem; and a replacement jig that includes a gripping portion and a pair of insertion portions extending from the gripping portion. A connecting hole that opens toward the valve seat is formed in a part of the stem on the valve seat side. The valve body unit includes: diaphragm that is provided to cover the valve chamber and keeps the valve chamber airtight; a valve body portion that is inserted into a central portion of the diaphragm and is configured to open and close the fluid passage by approaching the valve seat and separating from the valve seat; and a connecting member that includes a stem connection portion connected to the stem and a valve body connection portion connected to the valve body portion, and is inserted into the replacement ring. The stem connection portion of the connecting member is inserted into the connecting hole in the stem and connected to the stem by the connecting mechanism. The valve body unit includes a jig contacting portion on the opposite side of the diaphragm to the valve chamber side. The valve body unit is configured to be detached from the stem by: detaching the bonnet from the valve device body together with the stem and the valve body unit which are positioned at top dead center; moving the stem and the valve body unit to bottom dead center using the driving force generated by the driving means so as to move the jig contacting portion of the valve body portion to a position in which a distance between the jig contacting portion and the bonnet along an axis of the stem is longer than a thickness of the replacement jig; inserting the replacement jig between the jig contacting portion and the bonnet; moving the stem, the valve body unit, and the replacement jig to the top dead center side using the driving force generated by the driving means so that the replacement jig comes into contacts with the bonnet and the jig contacting portion comes into contact with the replacement jig; and in this state, moving only the stem to the opposite side to the valve seat side using the driving force generated by the driving means so that the connection formed between the stem connection portion and the stem by the connecting mechanism is released.

A method for replacing valve body unit of valve device according to one or more embodiments of the present disclosure, the valve device includes: a valve device body that has a fluid passage and a valve chamber formed therein and includes a valve seat; a tubular bonnet that is detachably provided on the valve device body; a driving portion that is configured to generate driving force; a stem that is supported by the bonnet and is configured to approach the valve seat and separate from the valve seat upon receipt of the driving force generated by the driving portion to open and close the fluid passage; a valve body unit that is connected to the stem and is configured to open and close the fluid passage by approaching the valve seat and separating from the valve seat; a connecting mechanism that connects the valve body unit to the stem; and a replacement jig that includes a gripping portion and a pair of insertion portions extending from the gripping portion. A connecting hole that opens toward the valve seat is formed in a part of the stem on the valve seat side. The valve body unit includes: a diaphragm that is provided to cover the valve chamber and keeps the valve chamber airtight; a valve body portion that is inserted into a central portion of the diaphragm and is configured to open and close the fluid passage by approaching the valve seat and separating from the valve seat; and a connecting member that includes a stem connection portion connected to the stem and a valve body connection portion connected to the valve body portion, and is inserted into the replacement ring. The stem connection portion of the connecting member is inserted into the connecting hole in the stem and connected to the stem by the connecting mechanism. The valve body unit includes a jig contacting portion on the opposite side of the diaphragm to the valve chamber side. The method includes: detaching the bonnet from the valve device body together with the stem and the valve body unit which are positioned at top dead center; moving the stem and the valve body unit to bottom dead center using the driving force generated by the driving means so as to move the jig contacting portion of the valve body portion to a position in which a distance between the jig contacting portion and the bonnet along an axis of the stem is longer than a thickness of the replacement jig; inserting the replacement jig between the jig contacting portion and the bonnet; moving the stem, the valve body unit, and the replacement jig to the top dead center side using the driving force generated by the driving means so that the replacement jig comes into contacts with the bonnet and the jig contacting portion comes into contact with the replacement jig; moving only the stem to the opposite side to the valve seat side using the driving force generated by the driving means so that the connection formed between the stem connection portion and the stem by the connecting mechanism is released and then the valve body unit is detached from the stem; and attaching a new valve body unit to the stem by inserting the stem connection portion of the connecting member of the new valve body unit into the connecting hole in the stem.

DETAILED DESCRIPTION

A valve device 1 according to a first embodiment of the present disclosure will be described with reference to the drawings.

Figure 1:
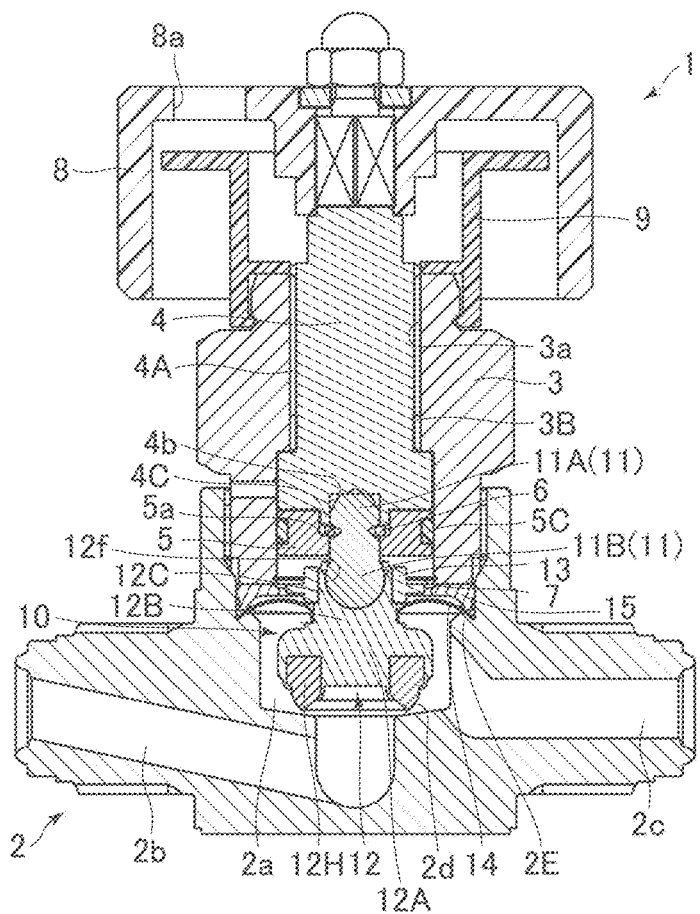
FIG. 1 illustrates a longitudinal cross-sectional view of a valve device in an open state according to a first embodiment.
Figure 2:
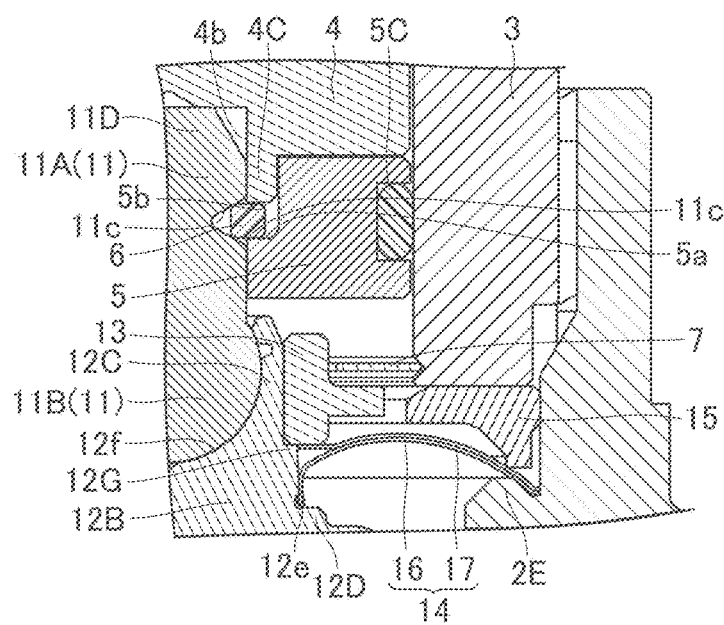
FIG. 2 illustrates an enlarged cross-sectional view of the vicinity of a fitting ring member of the valve device according to the first embodiment.
Figure 3:
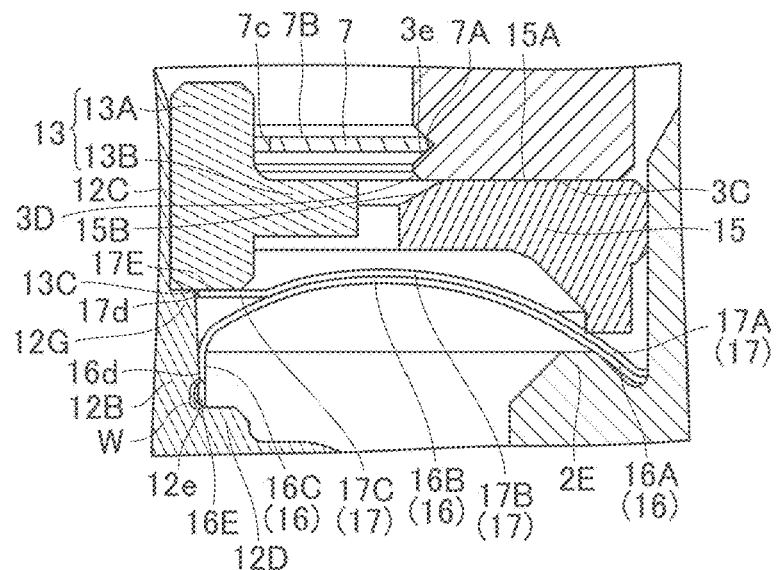
FIG. 3 illustrates an enlarged cross-sectional view of the vicinity of a replacement ring of the valve device according to the first embodiment.

FIG. 1 illustrates a longitudinal cross-sectional view of the valve device 1 according to the first embodiment in an open state. FIG. 2 illustrates an enlarged cross-sectional view of the vicinity of a fitting ring member 5 of the valve device 1. FIG. 3 illustrates an enlarged cross-sectional view of the vicinity of a replacement ring 7 of the valve device 1.

As illustrated in FIG. 1, the valve device 1 includes a valve device body 2, a bonnet 3, a stem 4, the fitting ring member 5, a connecting ring 6, the replacement ring 7, a valve body unit 10, a handle 8, and an indicator 9. Note that in the following description, the handle 8 side of the valve device 1 will be described as an upper side, and the valve device body 2 side will be described as a lower side.

A valve chamber 2a, and an inflow passage 2b and an outflow passage 2c that communicate with the valve chamber 2a are formed in the valve device body 2. A peripheral edge of a location, where the inflow passage 2b communicates with the valve chamber 2a, of the valve device body 2 forms an annular valve seat 2d.

The bonnet 3 has a substantially cylindrical shape and is fixed to the valve device body 2 so as to cover the valve chamber 2a by screwing a male screw portion provided on a lower end portion thereof into a female screw portion provided in an upper end portion of the valve device body 2. A stem insertion hole 3a is formed in the bonnet 3. Further, a female screw portion 3B is formed in an upper end portion of an inner periphery of the bonnet 3. The bonnet 3 has a lower surface 3C, and a first inclined surface 3D is formed around the entire circumference of an inner peripheral side of the lower surface 3C. The first inclined surface 3D is inclined relative to the axis of the stem 4 and configured such that the inner diameter thereof decreases from a lower end toward an upper end (so as to gradually separate from the valve seat 2d toward the inside thereof). Further, a fitting groove 3e is formed around the entire circumference of an inner peripheral surface of the bonnet 3 in a position removed from the first inclined surface 3D by a predetermined distance toward the upper side.

The stem 4 is inserted into the stem insertion hole 3a in the bonnet 3. A male screw portion 4A is formed on an upper side portion of the stem 4, and the male screw portion 4A is screwed into the female screw portion 3B in the bonnet 3. Thus, the stem 4 is supported so as to be capable of rotating relative to the bonnet 3 and moving in an up-down direction while rotating. When the stem 4 is at top dead center, the valve device 1 is in an open state, and when the stem 4 is at bottom dead center, the valve device 1 is in a closed state. An insertion hole 4b that opens downward is formed in a lower side portion of the stem 4. Further, an annular projecting portion 4C that projects downward is provided on a lower surface of the stem 4 so as to surround the insertion hole 4b.

The fitting ring member 5 is formed in an annular shape so as to include a counterbore hole 5a. The annular projecting portion 4C of the stem 4 is press-fitted into a large diameter portion of the counterbore hole 5a in the fitting ring member 5. The stem 4 and the fitting ring member 5 are thus integrated so as to operate integrally. Accordingly, the stem 4 and the fitting ring member 5 function as a stem. Further, the length of the annular projecting portion 4C is set to be shorter than the depth of the large diameter portion of the counterbore hole 5a such that an annular recessed portion 5b is formed by the annular projecting portion 4C and the fitting ring member 5. Furthermore, an O-ring 5C is interposed between the fitting ring member 5 and the bonnet 3.

The connecting ring 6 is formed from a flexible metallic material or a resin material, for example, and is substantially C-shaped when seen from above. The connecting ring 6 is provided to straddle the annular recessed portion 5b and a connecting groove 11c to be described below. The connecting ring 6 thus connects the valve body unit 10 to the stem 4 and the fitting ring member 5. The connecting ring 6 corresponds to a connecting mechanism.

The replacement ring 7 is formed from a metallic material such as stainless steel, for example, and is substantially C-shaped when seen from above. A ring outer peripheral portion 7A of the replacement ring 7 has an arc-shaped cross-section when cut on a plane that includes the axis thereof. The outer diameter of the replacement ring 7 is set to be larger than the inner diameter of a lower end of the first inclined surface 3D of the bonnet 3 in a state where no external force is exerted thereon (a free state), and an upper surface 7B thereof has a dimension by which the upper surface 7B contacts the lower surface 3C of the bonnet 3. Further, the replacement ring 7 is fitted into the fitting groove 3e in the bonnet 3. Note that the replacement ring 7 functions during replacement of the valve body unit 10, to be described below, but does not function during normal use of the valve device 1. More specifically, during normal use of the valve device 1, the fitting ring member 5 and a retaining ring 13 do not contact the replacement ring 7. The upper surface 7B and the lower surface 3C correspond respectively to a first surface and a second surface.

The valve body unit 10 includes a connecting member 11, a valve body holder 12, a valve body 12H, the retaining ring 13, a diaphragm 14, and a retaining adapter 15. As will be described below, the connecting member 11, valve body holder 12, valve body 12H, retaining ring 13, diaphragm 14, and retaining adapter 15 are formed integrally and can therefore be treated as a single component.

The connecting member 11 is provided on a lower end of the stem 4 and includes a columnar portion 11A and a hemispherical portion 11B. A tip end portion 11D of the columnar portion 11A is formed in a tapered shape and inserted into the counterbore hole 5a and the insertion hole 4b. A lower end portion of the counterbore hole 5a and the insertion hole 4b correspond to a connecting hole. A connecting groove 11c is formed in an outer peripheral surface of the columnar portion 11A in a position opposing the annular recessed portion 5b. The hemispherical portion 11B is formed in a substantially hemispherical shape (a shape between a hemisphere and a full sphere) and provided on a lower end of the columnar portion 11A. The columnar portion 11A and the hemispherical portion 11B correspond respectively to a stem connection portion and a valve body connection portion.

The valve body holder 12 includes a valve body holding portion 12A, a penetrating portion 12B, and a fitting portion 12C. The valve body holding portion 12A is substantially disc-shaped and holds the annular valve body 12H, which is formed from resin. A fluid passage is opened and closed by bringing the valve body 12H into contact with the valve seat 2d of the valve device body 2 and separating the valve body 12H from the valve seat 2d. The valve body holder 12 and the valve body 12H corresponds to a valve body portion.

The penetrating portion 12B is provided on an upper side of the valve body holding portion 12A and formed in a stepped columnar shape that tapers toward the upper side. A fixing groove 12e is formed around the entire circumference of an outer peripheral surface of a first step portion 12D of the penetrating portion 12B. The fitting portion 12C is provided on an upper side of the penetrating portion 12B and formed in a substantially cylindrical shape, and a fitting hole 12f that opens upward is formed therein. The fitting hole 12f is formed in a substantially hemispherical shape (a shape between a hemisphere and a full sphere) corresponding to the hemispherical portion 11B. The hemispherical portion 11B of the connecting member 11 is fitted into the fitting hole 12f. Thus, the valve body holder 12 and the connecting member 11 are connected so that the valve body holder 12 can slide around the outer surface of the hemispherical portion 11B. Further, the fitting portion 12C is formed to have a smaller diameter than the penetrating portion 12B so that a second step portion 12G is formed by the fitting portion 12C and the penetrating portion 12B.

The retaining ring 13 is provided on the opposite side of the diaphragm 14 to the valve chamber 2a side, and includes a cylindrical portion 13A and a flange portion 13B. By press-fitting the fitting portion 12C of the valve body holder 12 into the cylindrical portion 13A, the retaining ring 13 is fixed to the valve body holder 12. An inner diameter side of a lower surface 13C of the cylindrical portion 13A contacts the second step portion 12G, and an outer diameter side of the lower surface 13C of the cylindrical portion 13A is positioned further outward than the outer peripheral surface of the penetrating portion 12B. The cylindrical portion 13A penetrates the through-hole 7c of the replacement ring 7. The flange portion 13B projects outward in the radial direction of the cylindrical portion 13A from an intermediate part of the cylindrical portion 13A in the up-down direction. The flange portion 13B corresponds to a ring dropping portion and a jig contacting portion.

The diaphragm 14 is provided to cover the valve chamber 2a of the valve device body 2, thereby keeping the valve chamber 2a airtight. The diaphragm 14 includes a main diaphragm 16 and a support diaphragm 17.

The main diaphragm 16 is constituted by a single thin plate (thickness: 0.1 to 0.2 mm, for example) formed in a plate shape from nickel alloy or stainless steel, for example. The main diaphragm 16 directly opposes the valve chamber 2a and directly contacts a fluid such as a process gas. The main diaphragm 16 includes, in order from the outside toward the inside in the radial direction thereof, a first outer peripheral portion 16A, a first intermediate portion 16B, and a first inner peripheral portion 16C.

The first outer peripheral portion 16A, together with a second outer peripheral portion 17A of the support diaphragm 17, is provided between a fixing portion 2E formed on the valve device body 2 and the annular retaining adapter 15, and by tightening the bonnet 3, the first outer peripheral portion 16A and second outer peripheral portion 17A are compressed by the retaining adapter 15 and the valve device body 2 so as to be held in an airtight state. The first intermediate portion 16B has an arc-shaped cross-section when cut on a plane that includes the axis thereof.

The first inner peripheral portion 16C is formed so as to curve downward from an inner end of the first intermediate portion 16B. An inner peripheral surface of the first inner peripheral portion 16C contacts the outer peripheral surface of the penetrating portion 12B. A first penetrating hole 16d that is penetrated by the penetrating portion 12B of the valve body holder 12 is formed in a central portion of the main diaphragm 16 by an inner peripheral surface of the first inner peripheral portion 16C. A projecting portion is provided on a first terminal end portion 16E of the first inner peripheral portion 16C, and in a state where the projecting portion is fitted to the fixing groove 12c of the penetrating portion 12B, this part is welded W over the entire circumference thereof by electron beam welding, laser welding, or the like so that the first terminal end portion 16E of the first inner peripheral portion 16C is fixed to the penetrating portion 12B.

The support diaphragm 17 is provided on the upper side of the main diaphragm 16, or in other words the opposite side to the valve chamber 2a. The support diaphragm 17 is simply placed on the main diaphragm 16 and not adhered or otherwise joined thereto. The support diaphragm 17 is constituted by a single thin plate (thickness: 0.1 to 0.2 mm, for example) formed in a plate shape from metal, rubber, resin, or the like, for example. In this embodiment, the support diaphragm 17 is formed from a different material to the material forming the main diaphragm 16, but the support diaphragm 17 and the main diaphragm 16 may be formed from the same material. The support diaphragm 17 includes, in order from the outside toward the inside in the radial direction thereof, the second outer peripheral portion 17A, a second intermediate portion 17B, and a second inner peripheral portion 17C.

As described above, the second outer peripheral portion 17A, together with the first outer peripheral portion 16A of the main diaphragm 16, is provided between the fixing portion 2E of the valve device body 2 and the annular retaining adapter 15, and by tightening the bonnet 3, the second outer peripheral portion 17A and first outer peripheral portion 16A are compressed and held by the retaining adapter 15 and the valve device body 2. The second intermediate portion 17B has an arc-shaped cross-section when cut on a plane that includes the axis thereof, and a lower surface thereof contacts the first intermediate portion 16B. Further, the second intermediate portion 17B is configured such that the radial direction length thereof is shorter than that of the first intermediate portion 16B.

The second inner peripheral portion 17C curves from the inner end of the second intermediate portion 17B so as to separate from the main diaphragm 16 and extend toward the second step portion 12G of the valve body holder 12. The second inner peripheral portion 17C contacts the lower surface 13C of the retaining ring 13. In other words, a second terminal end portion 17D on the inner peripheral side of the support diaphragm 17 is separated from the first terminal end portion 16E on the inner peripheral side of the main diaphragm 16. Note that the support diaphragm 17 may contact the main diaphragm 16 while exerting pressing force thereon by configuring the second inner peripheral portion 17C to receive pressing force from the retaining ring 13. Further, a second penetrating hole 17d that is penetrated by the penetrating portion 12B of the valve body holder 12 is formed in a central portion of the support diaphragm 17 by an inner end of the second inner peripheral portion 17C.

The retaining adapter 15 is formed in an annular shape and disposed on the lower end of the bonnet 3 and the upper side of the diaphragm 14. The retaining adapter 15 has an upper surface 15A that contacts the lower surface 3C of the bonnet 3, and a second inclined surface 15B is formed around the entire circumference of an inner peripheral side of the upper surface 15A. The upper surface 15A corresponds to a third surface. The second inclined surface 15B is inclined relative to the axis of the stem 4 and configured such that the inner diameter thereof decreases from an upper end toward a lower end (so as to gradually approach the valve seat 2d toward the inside thereof). The upper end (the outer peripheral end) of the second inclined surface 15B is positioned further outward than the lower end (the outer peripheral end) of the first inclined surface 3D and positioned on the lower side of the lower surface 3C. In other words, the inner diameter of the upper end (the outer peripheral end) of the second inclined surface 15B is set to be larger than the inner diameter of the lower end (the outer peripheral end) of the first inclined surface 3D. Furthermore, the outer diameter of the replacement ring 7 is set to be smaller than the inner diameter of the upper end of the second inclined surface 15B in a state where no external force is exerted thereon, and the ring outer peripheral portion 7A of the replacement ring 7 has a dimension by which the ring outer peripheral portion 7A contacts the second inclined surface 15B.

The handle 8 is attached to an upper end of the stem 4, and when an operator rotates the handle 8 manually so as to generate driving force, the stem 4 receives the rotary driving force so as to rotate while moving in the up-down direction. A through hole 8a is formed in the handle 8. The handle 8 corresponds to a driving portion (an actuator).

The indicator 9 is fixed to an upper end of the bonnet 3. The words "Open" and "Closed" are printed on an upper surface of the indicator 9. When the handle 8 is rotated such that the valve device 1 is in the open state, the word "Open" is visible through the through hole 8a in the handle 8, and when the valve device 1 is in the closed state, the word "Closed" is visible through the through hole 8a in the handle 8.

In the valve device 1 of this embodiment, when the stem 4 moves up and down in response to a rotation operation of the handle 8, the valve body unit 10 moves up and down, the first inner peripheral portion 16C of the main diaphragm 16 and the second inner peripheral portion 17C of the support diaphragm 17 move up and down together therewith, the diaphragm 14 undergoes elastic deformation such that the valve body 12H contacts and separates from the valve seat 2d, and as a result, the inflow passage 2b and the outflow passage 2c are opened and closed.

Next, a method for assembling the valve device 1 of this embodiment will be described.

FIG. 4 to FIG. 8 illustrate explanatory diagrams of a method for assembling the valve device 1.

Figure 4:
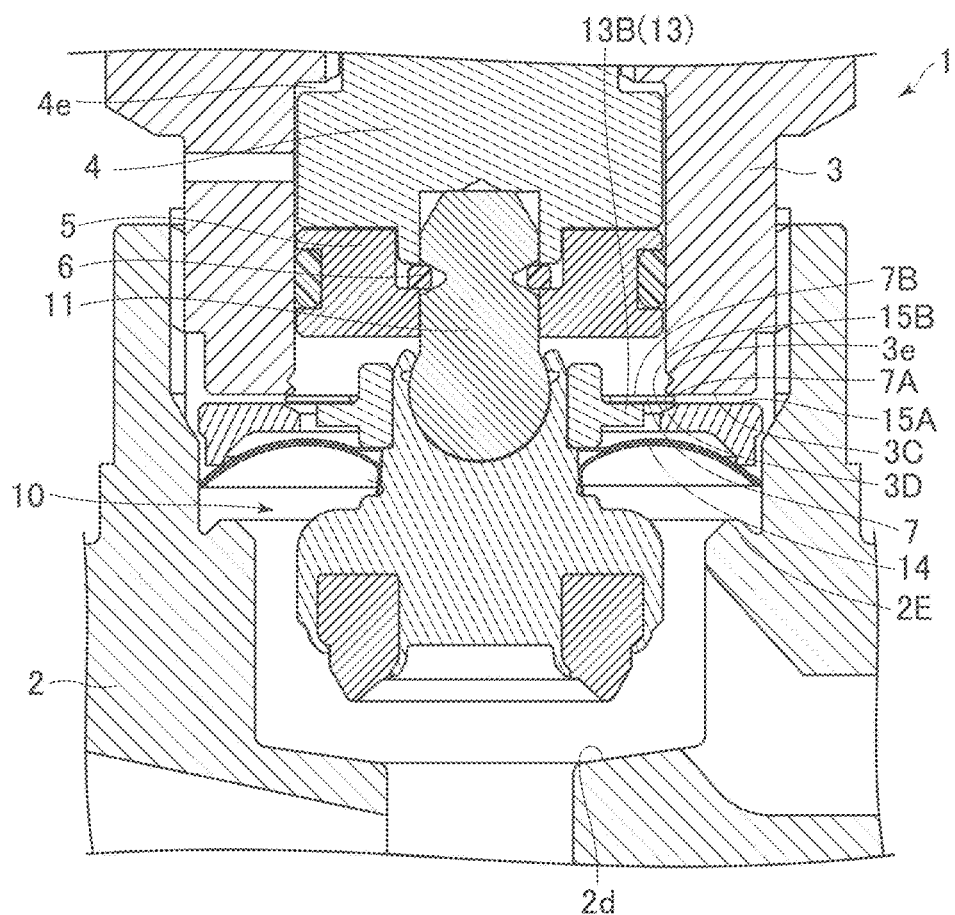
FIG. 4 illustrates an explanatory diagram of a method for assembling the valve device according to the first embodiment.

In FIG. 4, the valve body unit 10 is connected to the stem 4 and the fitting ring member 5 by the connecting ring 6, and the replacement ring 7 is placed on top of the flange portion 13B of the retaining ring 13 in a state where no external force is exerted thereon. By turning the handle 8 (FIG. 1) in an opening direction until the handle 8 stops, the upper surface 7B of the replacement ring 7 comes into contact with the lower surface 3C of the bonnet 3, and the ring outer peripheral portion 7A of the replacement ring 7 comes into contact with the second inclined surface 15B of the retaining adapter 15. As a result, a gap is formed between the lower surface 3C of the bonnet 3 and the upper surface 15A of the retaining adapter 15, and a gap 4e is also formed between the bonnet 3 and the stem 4. Furthermore, the bonnet 3 is fastened from the valve device body 2 not completely.

Figure 5:
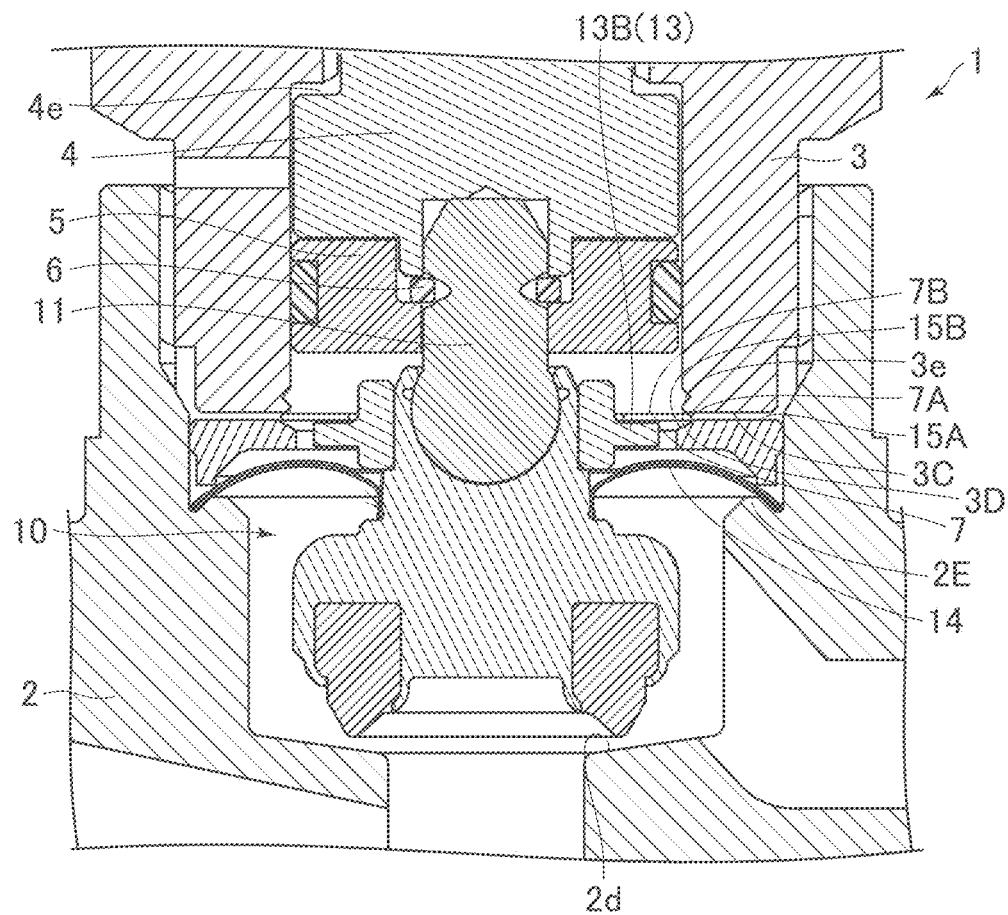
FIG. 5 illustrates an explanatory diagram of a method for assembling the valve device according to the first embodiment.
Figure 6:
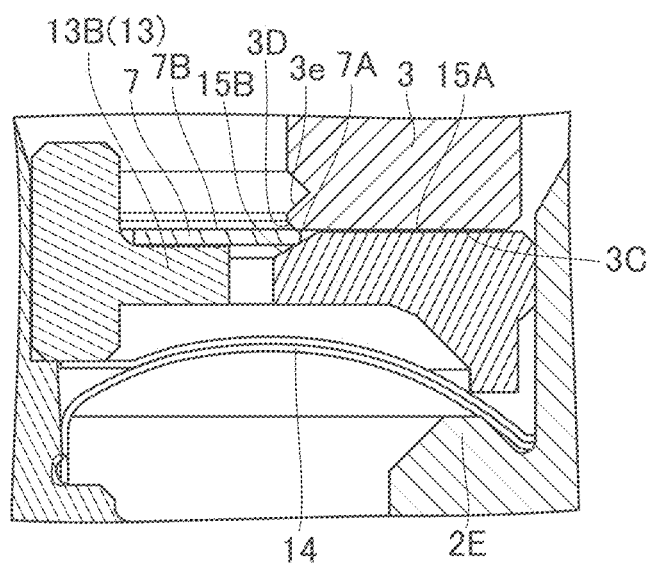
FIG. 6 illustrates an explanatory diagram of a method for assembling the valve device according to the first embodiment.

As illustrated in FIG. 5, by tightening the bonnet 3 from the state of the valve device 1 illustrated in FIG. 4 using a wrench or the like so that the diaphragm 14 comes into contact with the fixing portion 2E of the valve device body 2, and then further tightening the bonnet 3, the replacement ring 7 is pressed against the lower surface 3C of the bonnet 3 so as to decrease in diameter along the second inclined surface 15B of the retaining adapter 15. Then, when the lower surface 3C of the bonnet 3 comes into contact with the upper surface 15A of the retaining adapter 15, as illustrated in FIG. 6, the ring outer peripheral portion 7A of the replacement ring 7 comes into contact with the first inclined surface 3D of the bonnet 3.

Figure 7:
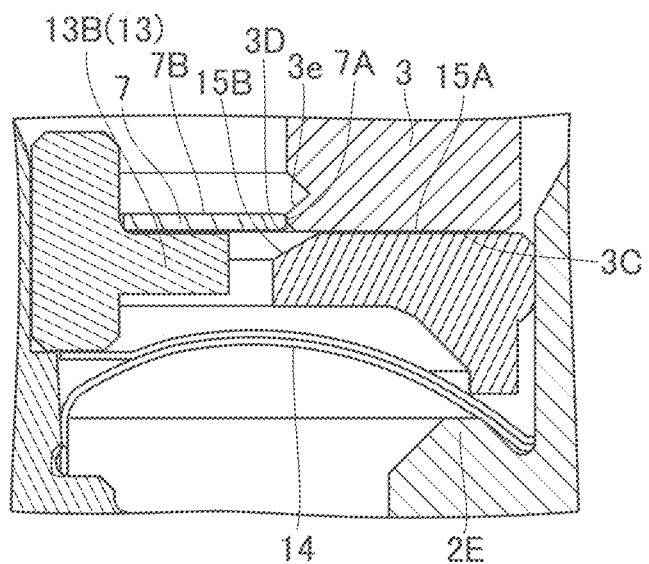
FIG. 7 illustrates an explanatory diagram of a method for assembling the valve device according to the first embodiment.
Figure 8:
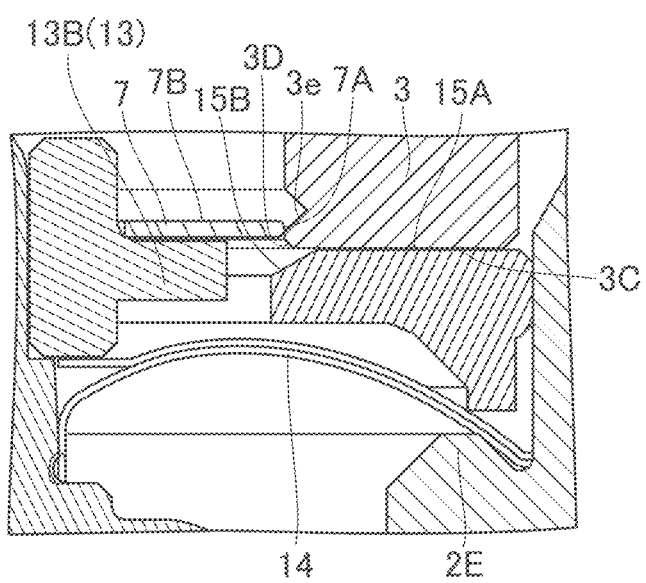
FIG. 8 illustrates an explanatory diagram of a method for assembling the valve device according to the first embodiment.

By turning the handle 8 (FIG. 1) in the opening direction from the state of the valve device 1 illustrated in FIG. 4, the retaining ring 13 is lifted such that the replacement ring 7 moves toward the upper side. Accordingly, as illustrated in FIG. 7, the ring outer peripheral portion 7A of the replacement ring 7 moves along the first inclined surface 3D of the bonnet 3 such that the diameter of the replacement ring 7 decreases further. As a result, the replacement ring 7 moves entirely to the inner peripheral side of the bonnet 3. Then, when the handle 8 (FIG. 1) is turned so as to move the stem 4 to top dead center, as illustrated in FIG. 8, the ring outer peripheral portion 7A of the replacement ring 7 moves to a position contacting the lower end of the fitting groove 3e. The ring outer peripheral portion 7A of the replacement ring 7 is arc-shaped, and since the replacement ring 7 is in a reduced-diameter state, the replacement ring 7 ascends along the inclined surface of the fitting groove 3e while increasing in diameter due to the restoring force thereof, thereby separating from the flange portion 13B of the retaining ring 13, and as a result, as illustrated in FIG. 3, the replacement ring 7 is fitted into the fitting groove 3e in the bonnet 3.

Thus, the replacement ring 7 is fitted into the fitting groove 3e in the bonnet 3 by being lifted further from a state in which the stem 4 is positioned at top dead center. Further, the distance between the valve body 12H and the valve seat 2d when the valve device 1 is in the open state is set to be smaller than the distance between the fitting ring member 5 and the replacement ring 7. Therefore, even when the valve device 1 is opened and closed, the fitting ring member 5 does not contact the replacement ring 7. Hence, the replacement ring 7 does not impede the opening and closing operations of the valve device 1. Moreover, when the bonnet 3 is fastened to the valve device body 2, the stem 4 is positioned near top dead center at all times, and therefore the valve body 12H does not contact the valve seat 2d.

According to the method for assembling the valve device 1 of this embodiment, as described above, the replacement ring 7 can easily be fitted into the fitting groove 3e in the bonnet 3. As a result, as will be described below, the valve body unit 10 can be replaced easily.

Next, a method for replacing the valve body unit 10 of this embodiment will be described.

FIG. 9 to FIG. 14 illustrate explanatory diagrams of a method for replacing the valve body unit 10 according to the first embodiment.

Figure 9:
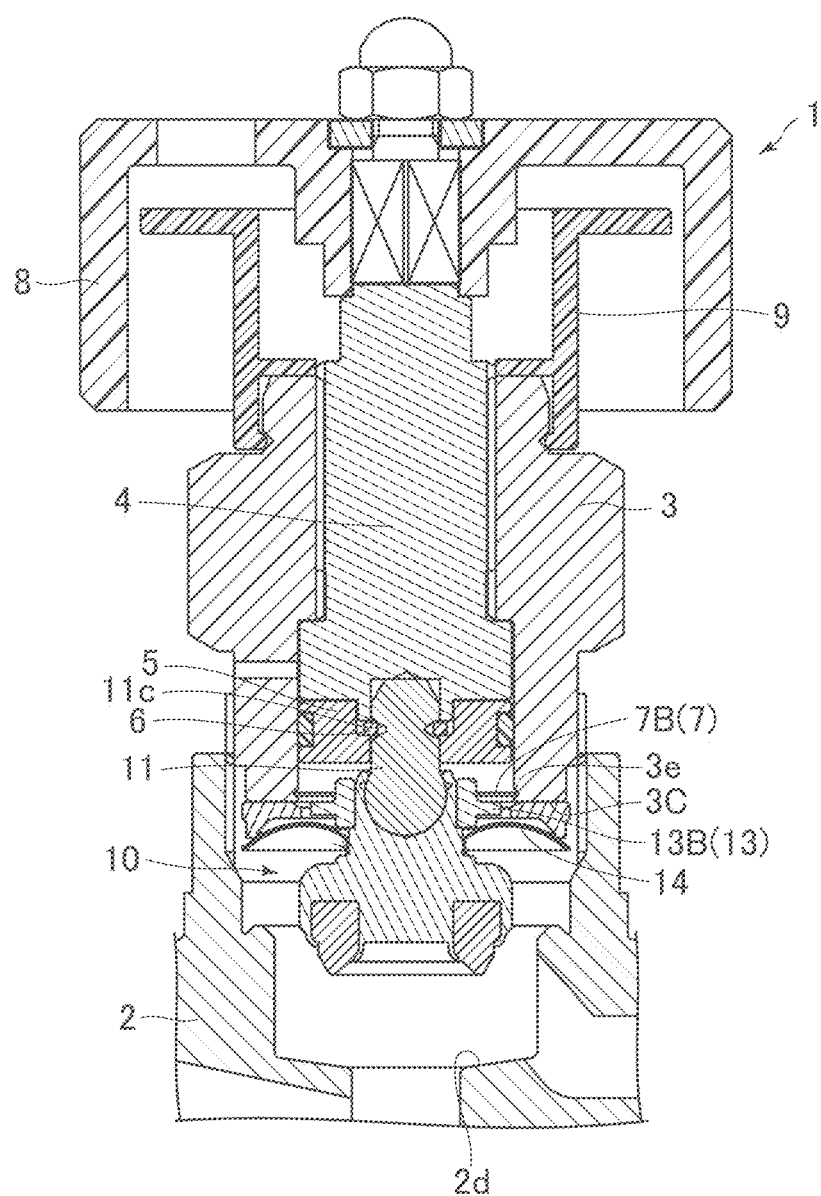
FIG. 9 illustrates an explanatory diagram of a method for replacing a valve body unit of the valve device according to the first embodiment.
Figure 10:
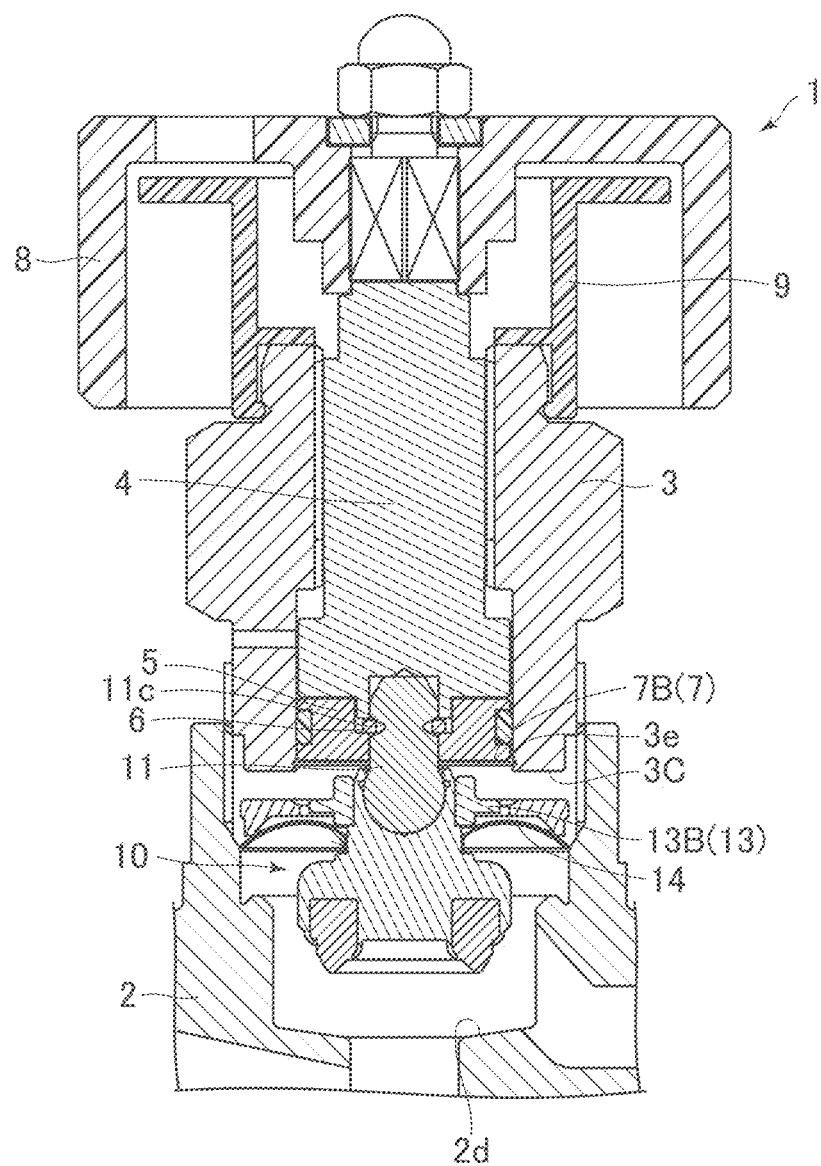
FIG. 10 illustrates an explanatory diagram of a method for replacing the valve body unit of the valve device according to the first embodiment.
Figure 11:
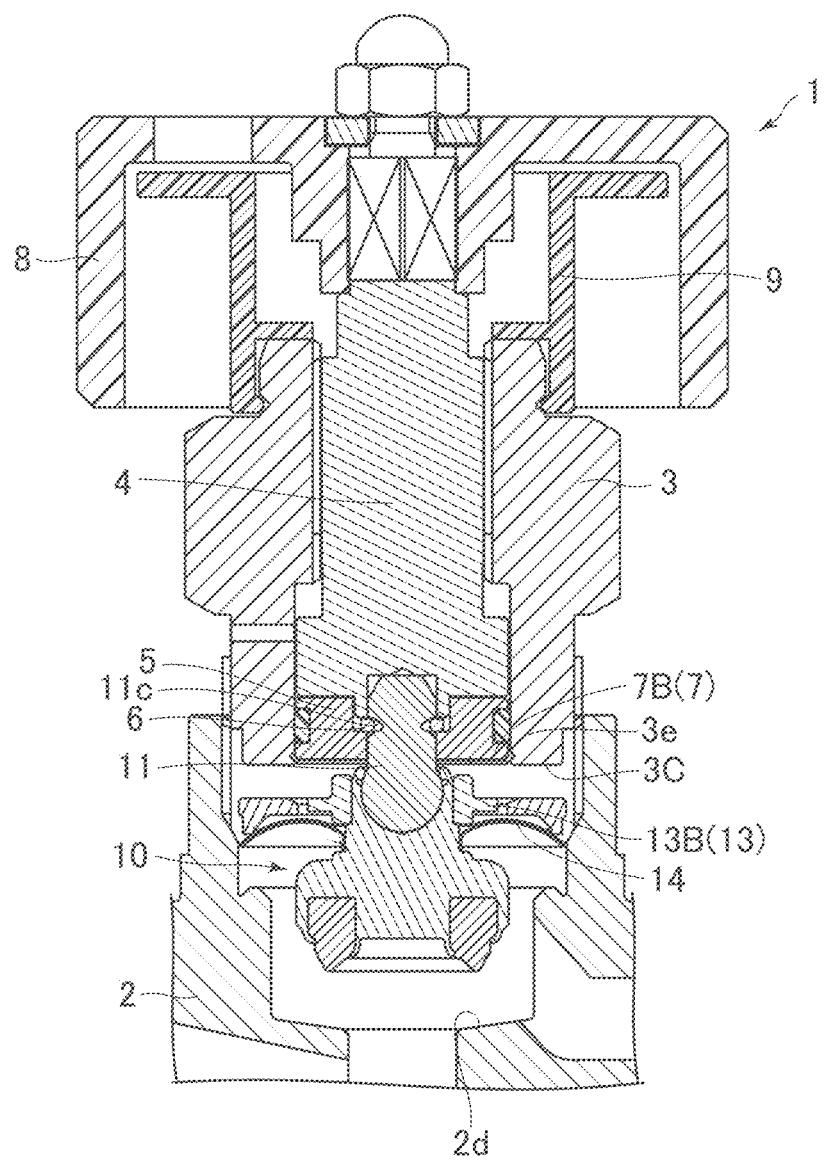
FIG. 11 illustrates an explanatory diagram of a method for replacing the valve body unit of the valve device according to the first embodiment.
Figure 12:
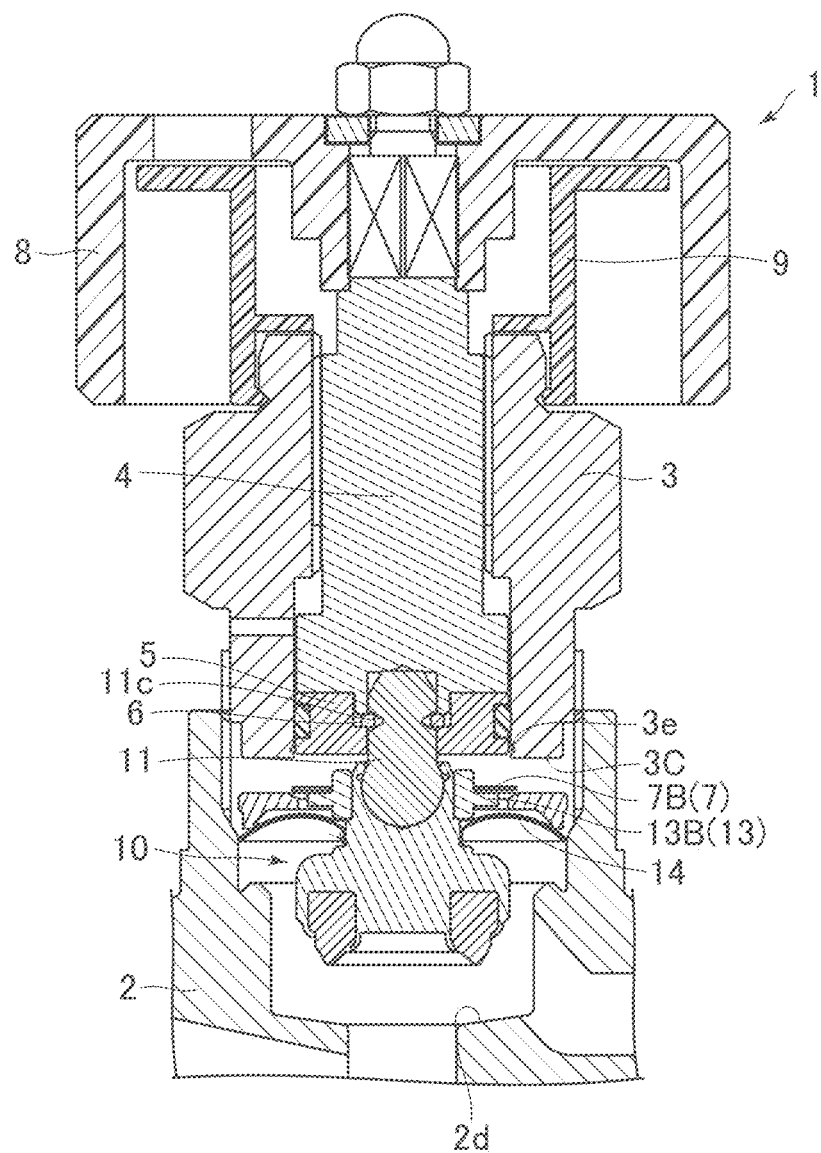
FIG. 12 illustrates an explanatory diagram of a method for replacing the valve body unit of the valve device according to the first embodiment.

As illustrated in FIG. 9, in the valve device 1 in which the stem 4 is positioned at top dead center (the valve device 1 in a fully open state), the bonnet 3, which is fastened to the valve device body 2 so as to compress the diaphragm 14, is loosened from the valve device body 2 by being rotated using a wrench or the like. As a result, the valve body unit 10 separates from the valve seat 2d. In this state, by turning the handle 8 in a closing direction, the stem 4 descends such that the fitting ring member 5 comes into contact with the replacement ring 7, as illustrated in FIG. 10. By turning the handle 8 further in the closing direction, the replacement ring 7 is pressed against the fitting ring member 5 so as to decrease in diameter, as illustrated in FIG. 11, whereupon the replacement ring 7 is disengaged from the fitting groove 3e and, as illustrated in FIG. 12, drops down from the bonnet 3 onto the retaining ring 13. As a result, the outer diameter of the replacement ring 7 returns to the free state.

Figure 13:
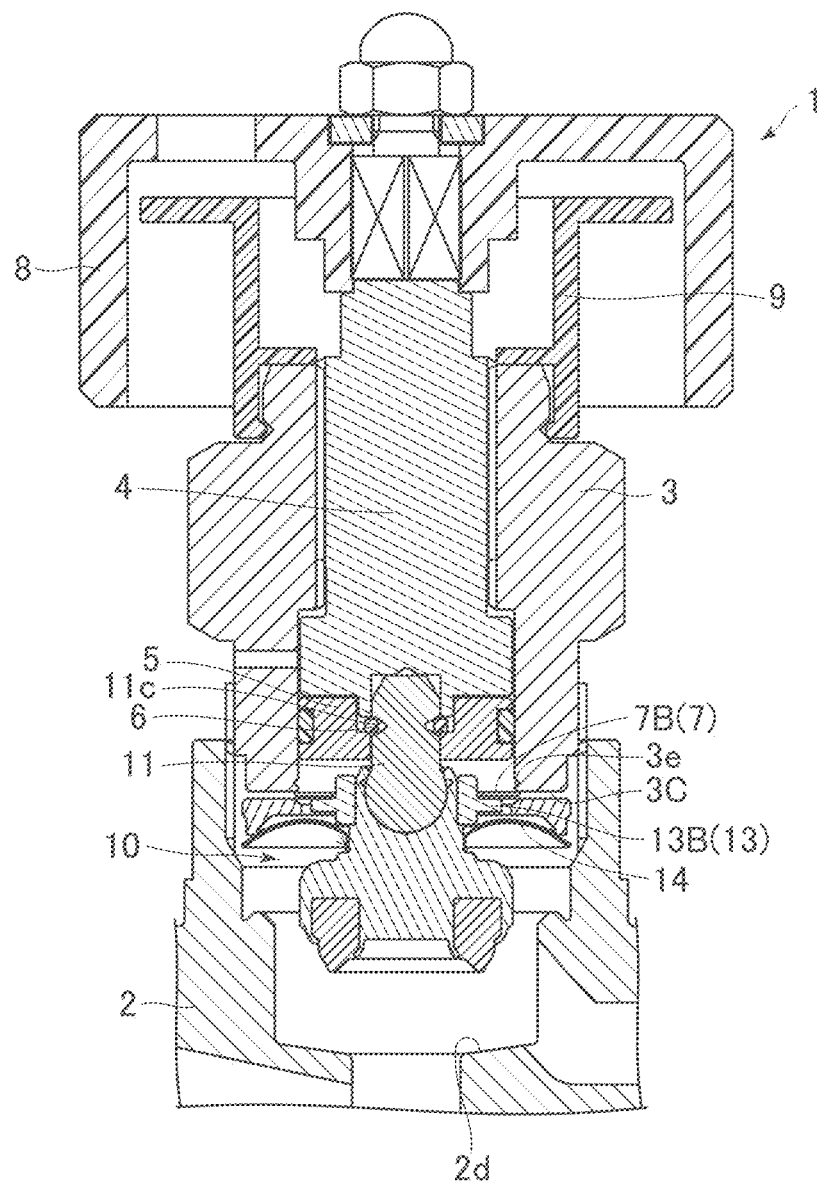
FIG. 13 illustrates an explanatory diagram of a method for replacing the valve body unit of the valve device according to the first embodiment.
Figure 14:
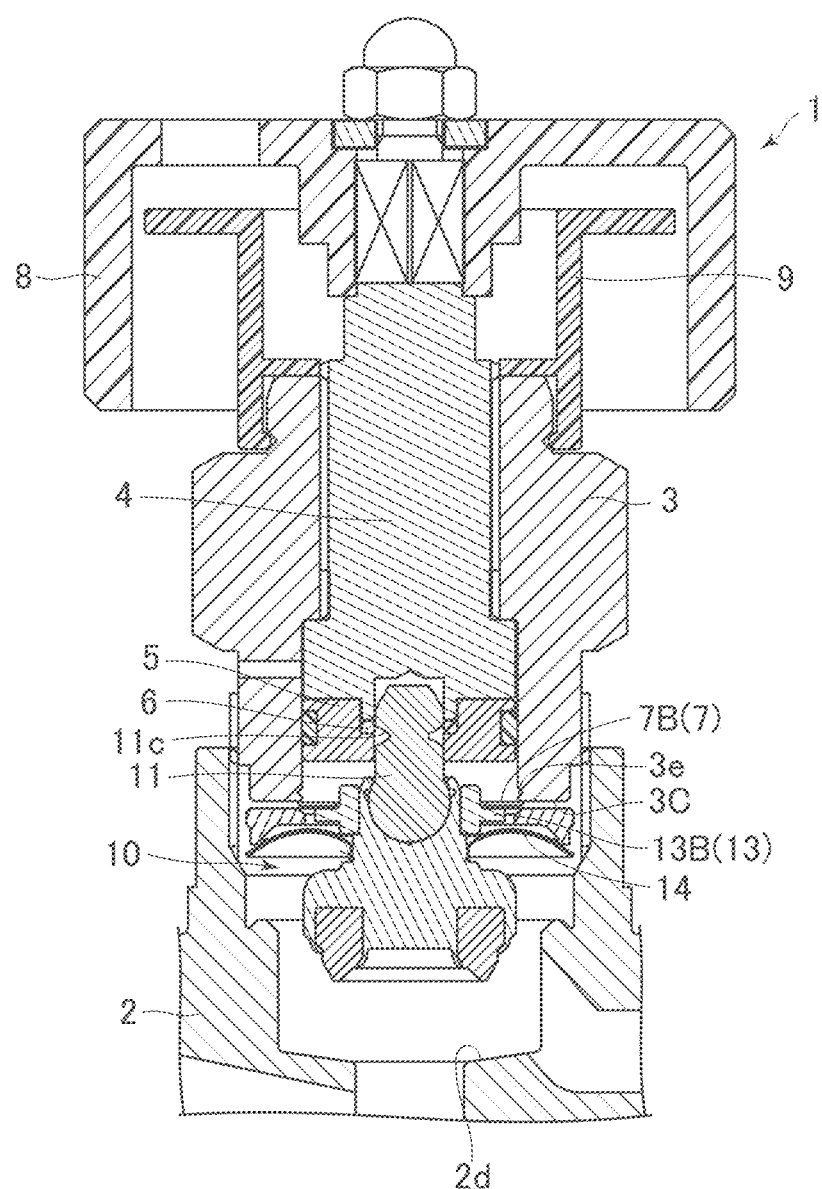
FIG. 14 illustrates an explanatory diagram of a method for replacing the valve body unit of the valve device according to the first embodiment.

Next, when the handle 8 is turned in the opening direction so as to ascend, the upper surface 7B of the replacement ring 7 comes into surface contact with the lower surface 3C of the bonnet 3, as illustrated in FIG. 13. When the handle 8 is turned further in the opening direction, the stem 4 ascends, but since the upper surface 7B of the replacement ring 7 is in surface contact with the lower surface 3C of the bonnet 3 and the flange portion 13B of the retaining ring 13 is in contact with the replacement ring 7, the valve body unit 10 cannot ascend. Therefore, as illustrated in FIG. 14, only the stem 4 and the fitting ring member 5 ascend, whereby force is exerted on the connecting ring 6 by the inclined surface of the connecting groove 11c in the connecting member 11, causing the diameter of the connecting ring 6 to increase, and as a result, the connecting member 11 is disengaged from the connecting member 11. Thus, the connection formed by the connecting ring 6 between the connecting member 11 and the stem 4 is released.

By disengaging the bonnet 3 from the valve device body 2 in this state, the valve body unit 10 can be detached from the stem 4 and so on. Then, by inserting the columnar portion 11A of the connecting member 11 of a new valve body unit 10 into a lower side portion of the counterbore hole 5a in the fitting ring member 5 and the insertion hole 4b in the stem 4 using the assembly method described above, the new valve body unit 10 can be attached to the stem 4 and so on. Thus, with the valve device 1 of this embodiment, the valve body unit 10 can be replaced easily.

Next, a valve device 21 according to a second embodiment of the present disclosure will be described. Only parts that differ from the valve device 1 according to the first embodiment will be described.

Figure 15:
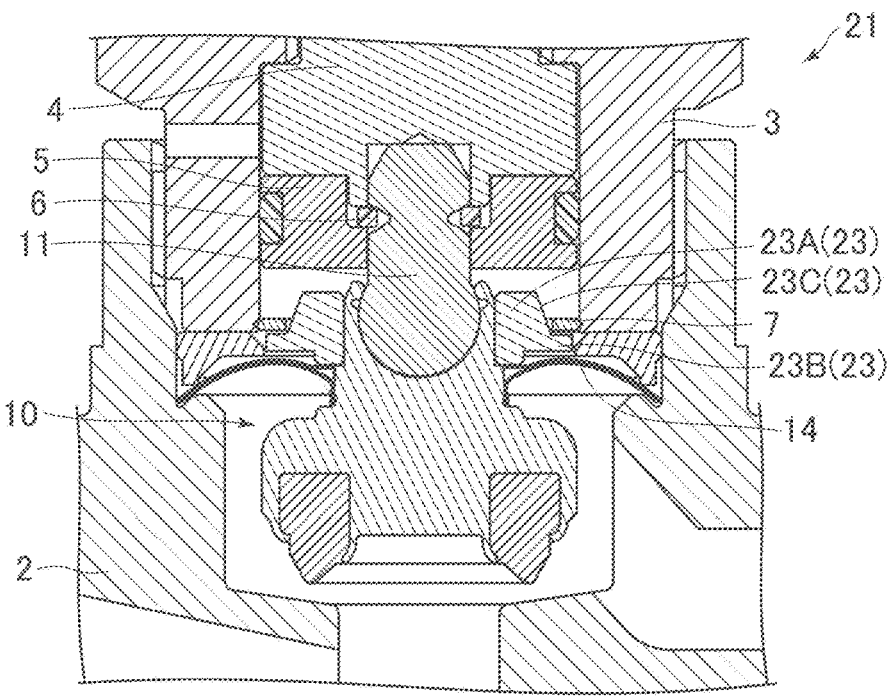
FIG. 15 illustrates an enlarged cross-sectional view of the vicinity of a valve body unit of a valve device according to a second embodiment.
Figure 16:
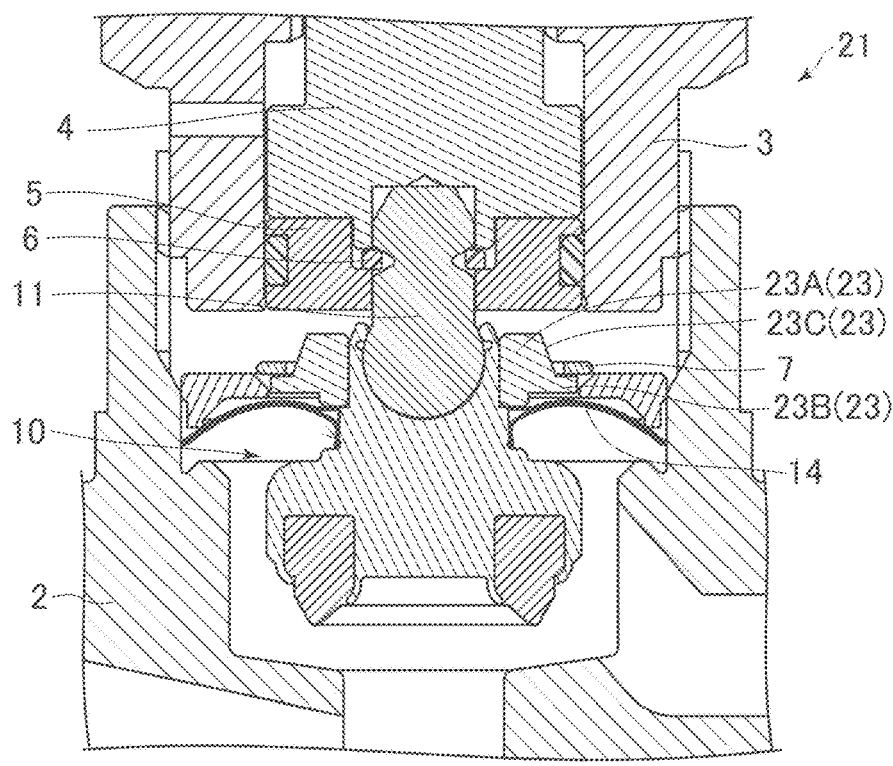
FIG. 16 illustrates an explanatory diagram of one step of a method for replacing the valve body unit of the valve device according to the second embodiment.

FIG. 15 illustrates an enlarged cross-sectional view of the vicinity of the valve body unit 10 of the valve device 21 according to the second embodiment. FIG. 16 illustrates an explanatory diagram of one step of a method for replacing the valve body unit 10 of this embodiment.

As illustrated in FIG. 15, in the valve device 21 of this embodiment, an outer peripheral surface 23C of a cylindrical portion 23A of a retaining ring 23 has a tapered shape that tapers toward the fitting ring member 5. As illustrated in FIG. 16, when the replacement ring 7 drops down from the bonnet 3 onto a flange portion 23B of the retaining ring 23 during replacement of the valve body unit 10, the replacement ring 7 drops down while being guided by the outer peripheral surface 23C, and as a result, the replacement ring 7 can drop down onto the desired position. The cylindrical portion 23A corresponds to a guide portion.

Furthermore, likewise with the valve device 21 of this embodiment, similar actions and effects to those exhibited by the valve device 1 of the first embodiment can be achieved.

Next, a valve device 31 according to a third embodiment of the present disclosure will be described. Only parts that differ from the valve device 1 according to the first embodiment will be described.

Figure 17:
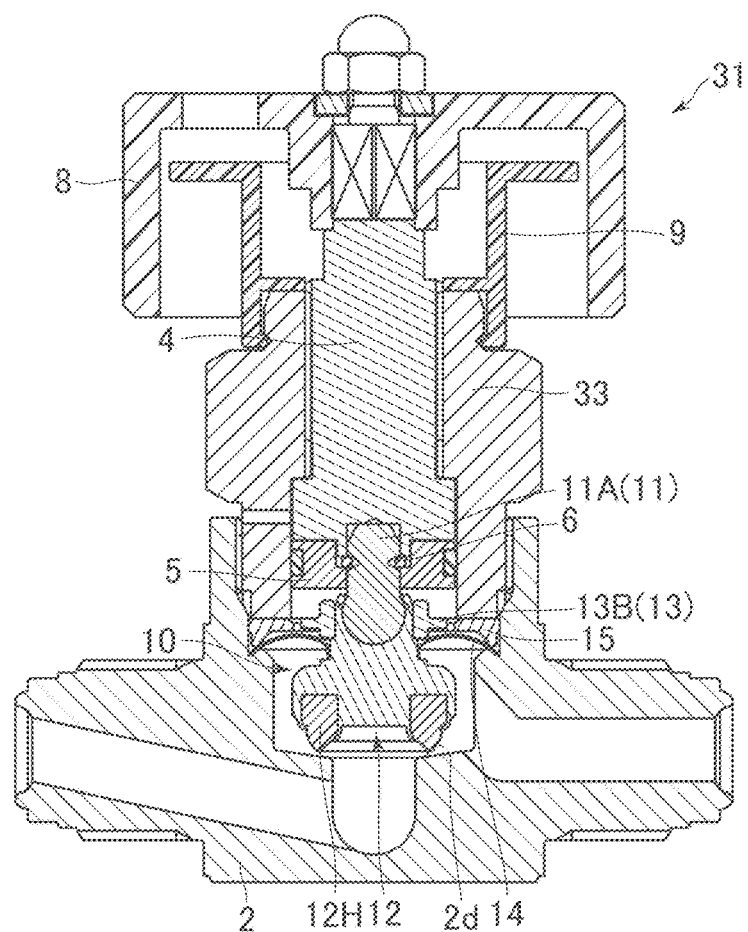
FIG. 17 illustrates a longitudinal cross-sectional view of a valve device in an open state according to a third embodiment.

FIG. 17 illustrates a longitudinal cross-sectional view of the valve device 31 according to the third embodiment in an open state.

The valve device 31 of this embodiment does not include the replacement ring 7 of the valve device 1 of the first embodiment. Accordingly, the fitting groove 3e is not formed in the inner peripheral surface of a bonnet 33. Since the valve device 31 of this embodiment does not include the replacement ring 7, in contrast to the valve device 1 of the first embodiment, the valve body unit 10 cannot be detached from the valve device 31 without using a jig.

Next, a method for replacing the valve body unit 10 of the valve device 31 will be described.

Figure 18A:
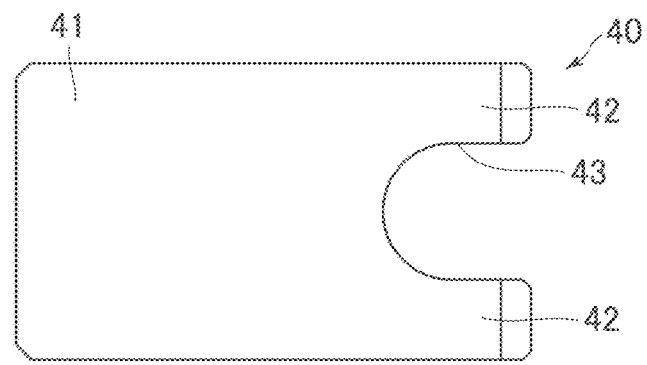
FIG. 18A and FIG. 18B illustrate an explanatory diagram of a replacement jig for disengaging the valve body unit.
Figure 18B:

FIG. 18A and FIG. 18B illustrate an explanatory diagram of a replacement jig 40 for removing the valve body unit 10. FIG. 19 to FIG. 23 illustrate explanatory diagrams of a method for replacing the valve body unit 10 according to the third embodiment. Note that the valve device body 2 is not illustrated in FIG. 20 to FIG. 23.

As illustrated in FIG. 18A and FIG. 18B, the replacement jig 40 is formed from a metallic material such as stainless steel, for example, has a rectangular flat-plate shape when seen from above, and includes a gripping portion 41 and a pair of insertion portions 42 extending from the gripping portion 41. An insertion space 43 is formed between the pair of insertion portions 42. The distance between the pair of insertion portions 42 is set to be larger than the outer diameter of the columnar portion 11A of the connecting member 11 and smaller than the outer diameter of the flange portion 13B of the retaining ring 13.

Figure 19:
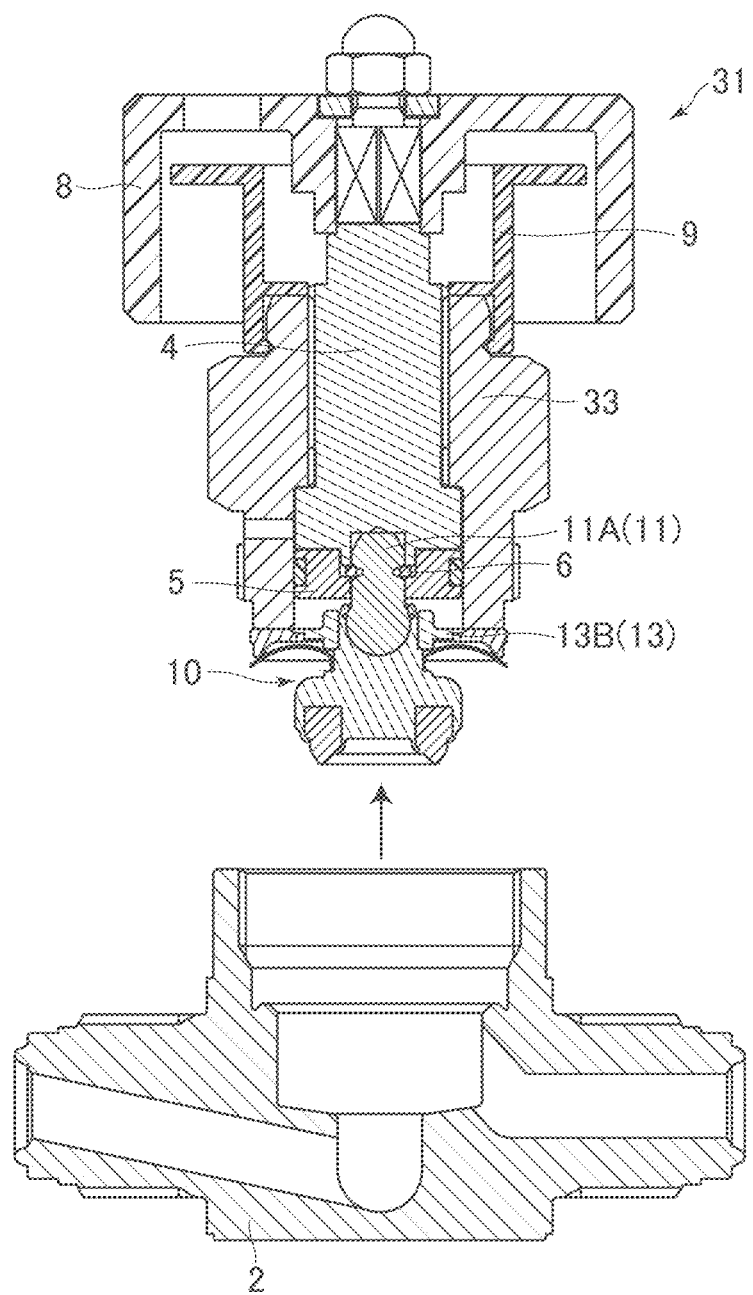
FIG. 19 illustrates an explanatory diagram of a method for replacing the valve body unit of the valve device according to the third embodiment.
Figure 20:
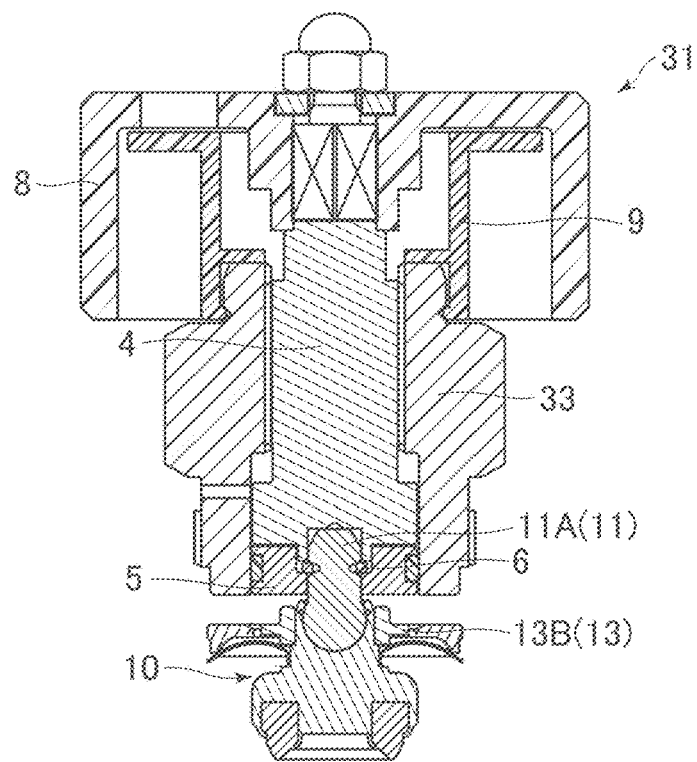
FIG. 20 illustrates an explanatory diagram of a method for replacing the valve body unit of the valve device according to the third embodiment.

As illustrated in FIG. 19, in the valve device 31 in which the stem 4 is positioned at top dead center (the valve device 31 in the fully open state), the bonnet 3 is disengaged from the valve device body 2 by being rotated using a wrench or the like. As illustrated in FIG. 20, by turning the handle 8 in the closing direction, the stem 4 descends to bottom dead center. As a result, the flange portion 13B of the retaining ring 13 moves to a position in which the axial distance between the flange portion 13B and the lower surface 3C of the bonnet 3 is longer than the thickness of the replacement jig 40.

Figure 21:
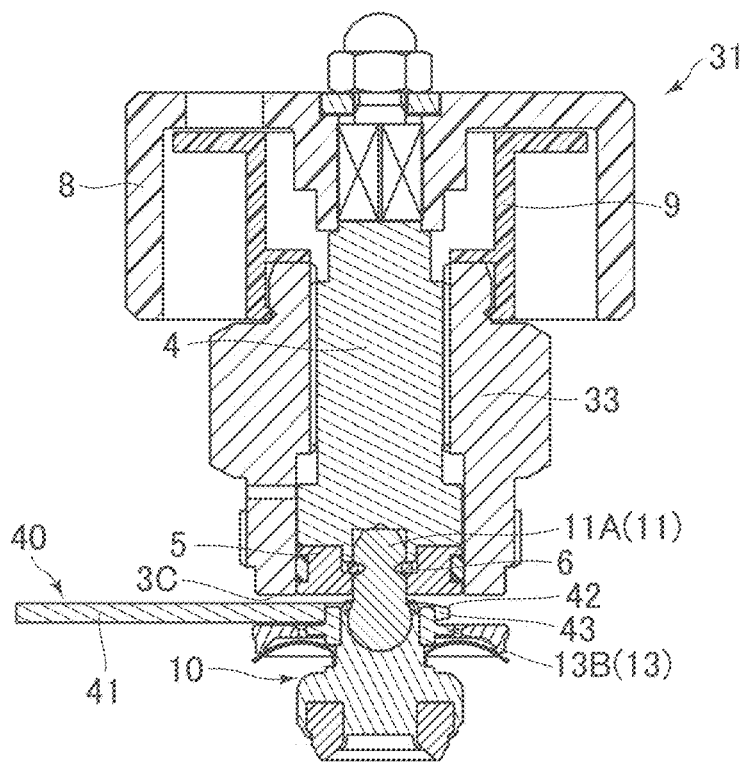
FIG. 21 illustrates an explanatory diagram of a method for replacing the valve body unit of the valve device according to the third embodiment.

Next, as illustrated in FIG. 21, the pair of insertion portions 42 of the replacement jig 40 are inserted between the fitting ring member 5 and the retaining ring 13 so that the retaining ring 13 is positioned in the insertion space 43. When the handle 8 is turned in the opening direction from the state illustrated in FIG. 21, the stem 4, the fitting ring member 5, the valve body unit 10, and the replacement jig 40 ascend such that the gripping portion 41 of the replacement jig 40 comes into contact with the lower surface 3C of the bonnet 33.

Figure 22:
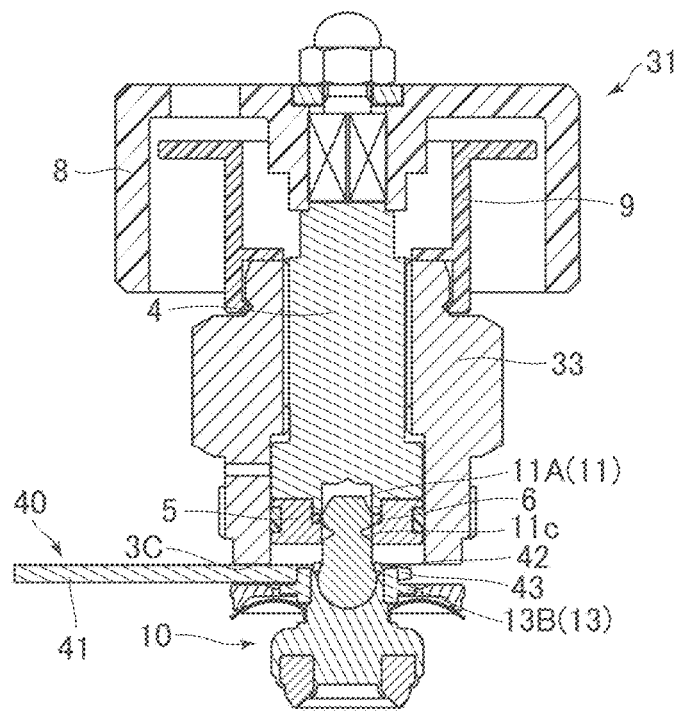
FIG. 22 illustrates an explanatory diagram of a method for replacing the valve body unit of the valve device according to the third embodiment.

When the handle 8 is turned further in the opening direction, the stem 4 ascends, but since the gripping portion 41 of the replacement jig 40 is in surface contact with the lower surface 3C of the bonnet 33 and the flange portion 13B of the retaining ring 13 is in contact with the gripping portion 41 and the insertion portions 42 of the replacement jig 40, the valve body unit 10 cannot ascend. Therefore, as illustrated in FIG. 22, only the stem 4 and the fitting ring member 5 ascend, whereby the diameter of the connecting ring 6 is increased by the inclined surface of the connecting groove 11c of the connecting member 11, and as a result, the connecting member 11 is disengaged from the connecting ring 6.

Figure 23:
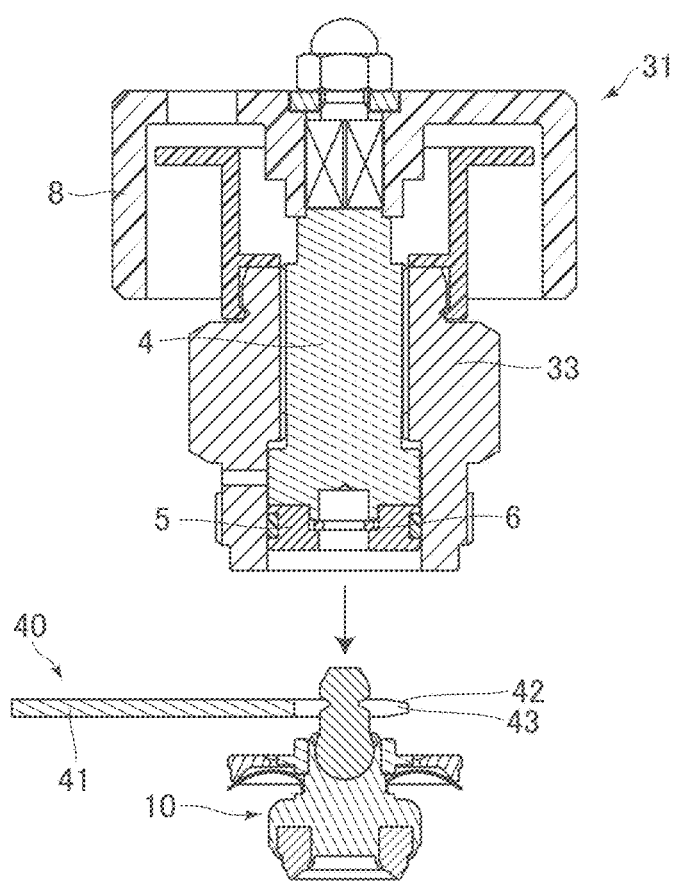
FIG. 23 illustrates an explanatory diagram of a method for replacing the valve body unit of the valve device according to the third embodiment.

As illustrated in FIG. 23, by pressing the replacement jig 40 down toward the lower side, the valve body unit 10 can be detached from the stem 4 and the fitting ring member 5 of the valve device 31. Then, by inserting the columnar portion 11A of the connecting member 11 of a new valve body unit 10 into the lower side portion of the counterbore hole 5a in the fitting member 5 and the insertion hole 4b in the stem 4, the new valve body unit 10 can be attached to the stem 4 and so on. Thus, with the valve device 31 of this embodiment, the valve body unit 10 can be replaced easily.

The present disclosure is not limited to the above-described embodiments. Those skilled in the art can made various additions, changes, and the like within the scope of the present disclosure.

For example, in the above-described embodiments, the manually operated handle 8 is used as driving portion (actuator) for moving the stem 4 up and down, but automatic driving portion may be used instead. Hydraulic driving portion may be employed as the automatic driving portion. Similar effects to those of the valve devices 1, 21, and 31 of the above-described embodiments are achieved with a valve device having this configuration.

Further, the support diaphragm 17 may be formed integrally with the main diaphragm 16. Furthermore, the connecting ring 6 serving as the connecting mechanism may be constituted by a ball plunger. When a ball plunger is used, the ball plunger may be embedded in the columnar portion 11A of the connecting member 11 so that the ball on the tip end of the ball plunger enters the annular recessed portion 5b. In this case, the connecting groove 11c need not be formed in the columnar portion 11A. Alternatively, the ball plunger may be embedded in the part of the stem 4 where the insertion hole 4b is formed so that the ball on the tip end of the ball plunger projects into the insertion hole 4b and thereby enters the connecting groove 11c. In this case, the annular recessed portion 5b need not be formed.

What is claimed is:

1. A valve device comprising:
   a valve device body that has a fluid passage and a valve chamber formed therein and includes a valve seat;
   a tubular bonnet that is connected to the valve device body to be capable of approaching the valve seat and separating from the valve seat;
   a driving portion that is configured to generate driving force;
   a stem that is supported by the tubular bonnet and is configured to approach the valve seat and separate from the valve seat upon receipt of the driving force generated by the driving portion to open and close the fluid passage;
   a valve body unit that is connected to the stem and is configured to open and close the fluid passage by approaching the valve seat and separating from the valve seat;
   a replacement ring that is provided in the tubular bonnet; and
   a connecting mechanism that connects the valve body unit to the stem, wherein
   a connecting hole that opens toward the valve seat is formed in a part of the stem on a valve seat side,
   the valve body unit includes:
      a diaphragm that is provided to cover the valve chamber and keeps the valve chamber airtight;
      a valve body portion that is inserted into a central portion of the diaphragm and is configured to open and close the fluid passage by approaching the valve seat and separating from the valve seat; and
      a connecting member that includes a stem connection portion connected to the stem and a valve body connection portion connected to the valve body portion, and is inserted into the replacement ring,
   the stem connection portion of the connecting member is inserted into the connecting hole in the stem and connected to the stem by the connecting mechanism,
   the valve body portion includes a ring dropping portion on an opposite side of the diaphragm to a valve chamber side,
   the replacement ring is provided on an inner peripheral surface of the tubular bonnet, and a first surface of the replacement ring on a stem side has a dimension that enables contact with a second surface of the tubular bonnet on the valve seat side when the replacement ring is in a free state, and
   the valve body unit is configured to be disengaged from the stem by moving the stem and the valve body unit to the valve seat side using the driving force generated by the driving portion in a state where the tubular bonnet is separated from the valve seat, thereby pushing the replacement ring such that the replacement ring moves through the tubular bonnet while decreasing in diameter and then drops down onto the ring dropping portion of the valve body unit in the free state, then moving the stem, the valve body unit, and the replacement ring to an opposite side to the valve seat side using the driving force generated by the driving portion such that the first surface of the replacement ring comes into contact with the second surface of the tubular bonnet and the ring dropping portion of the valve body unit comes into contact with the replacement ring, and in this state, moving only the stem to the opposite side to the valve seat side using the driving force generated by the driving portion such that a connection formed by the connecting mechanism between the stem connection portion and the stem is released.

2. The valve device according to claim 1, wherein the valve body unit includes a cylindrical guide portion on the opposite side of the diaphragm to the valve chamber side, and an outer peripheral surface of the cylindrical guide portion has a tapered shape that tapers toward the stem.

3. The valve device according to claim 1, wherein the valve body unit includes a retaining adapter configured to compress the diaphragm together with the valve device body,
   a first inclined surface that gradually separates from the valve seat toward an inside thereof is formed on an inner peripheral end of the second surface of the tubular bonnet, and a fitting groove into which the replacement ring is configured to be fitted is formed on an upper side of the first inclined surface of the tubular bonnet,
   the retaining adapter has a third surface that is configured to contact the second surface and a second inclined surface that is formed on an inner peripheral end of the third surface, inclines relative to an axis of the stem, and gradually approaches the valve seat toward the inside thereof,
   the replacement ring includes an outer peripheral portion having an arc-shaped cross-section when cut on a plane that includes an axis thereof, an outer diameter of the replacement ring is set to be smaller than an inner diameter of an end portion of the second inclined surface on the third surface side when the replacement ring is in the free state, and the outer peripheral portion is configured to be capable of contacting the second inclined surface, and
   the replacement ring is configured to be attached to the tubular bonnet by bringing the outer peripheral portion of the replacement ring, which is in the free state, into contact with the second inclined surface in a state where the tubular bonnet is separated from the valve seat, then causing the tubular bonnet to approach the valve seat such that the replacement ring is compressed between the second surface of the tubular bonnet and the second inclined surface, then causing the replacement ring to decrease in diameter along the second inclined surface until the outer peripheral portion of the replacement ring comes into contact with the first inclined surface, and then moving the stem and the valve body unit to the opposite side to the valve seat side using the driving force generated by the driving portion so that the replacement ring moves to the stem side from the ring dropping portion, such that the replacement ring is caused to move along the first inclined surface while decreasing in diameter and the replacement ring is fitted into the fitting groove.

4. The valve device according to claim 1, wherein the replacement ring is provided in a position that does not impede a movement of the stem and the valve body unit during opening and closing operations of the valve device.

5. The valve device according to claim 3, wherein, after bringing the outer peripheral portion of the replacement ring into contact with the first inclined surface by causing the outer diameter of the replacement ring to decrease along the second inclined surface, the stem and the valve body unit are moved to the opposite side to the valve seat side by the driving force generated by the driving portion until the stem is positioned at a top dead center of the tubular bonnet, and in this state, the outer peripheral portion of the replacement ring is brought into contact with an end portion of the fitting groove on the valve seat side, such that the replacement ring in a reduced-diameter state is caused to move while increasing in diameter due to a restoring force thereof and the replacement ring is fitted into the fitting groove.

6. A method for replacing valve body unit of valve device, the valve device comprising:
    a valve device body that has a fluid passage and a valve chamber formed therein and includes a valve seat;
    a tubular bonnet that is connected to the valve device body to be capable of approaching the valve seat and separating from the valve seat;
    a driving portion that is configured to generate driving force;
    a stem that is supported by the tubular bonnet and is configured to approach the valve seat and separate from the valve seat upon receipt of the driving force generated by the driving portion to open and close the fluid passage;
    a valve body unit that is connected to the stem and is configured to open and close the fluid passage by approaching the valve seat and separating from the valve seat;
    a replacement ring that is provided in the tubular bonnet; and
    a connecting mechanism that connects the valve body unit to the stem, wherein
a connecting hole that opens toward the valve seat is formed in a part of the stem on a valve seat side,
the valve body unit includes:
    a diaphragm that is provided to cover the valve chamber and keeps the valve chamber airtight;
    a valve body portion that is inserted into a central portion of the diaphragm and is configured to open and close the fluid passage by approaching the valve seat and separating from the valve seat; and a connecting member that includes a stem connection portion connected to the stem and a valve body connection portion connected to the valve body portion, and is inserted into the replacement ring,
the stem connection portion of the connecting member is inserted into the connecting hole in the stem and connected to the stem by the connecting mechanism,
the valve body portion includes a ring dropping portion on an opposite side of the diaphragm to a valve chamber side,
the replacement ring is provided on an inner peripheral surface of the tubular bonnet, and a first surface of the replacement ring on a stem side has a dimension that enables contact with a second surface of the tubular bonnet on the valve seat side when the replacement ring is in a free state,
the method comprising:
moving the stem and the valve body unit to the valve seat side using the driving force generated by the driving portion in a state where the tubular bonnet is separated from the valve seat, thereby pushing the replacement ring such that the replacement ring moves through the tubular bonnet while decreasing in diameter and then drops down onto the ring dropping portion of the valve body unit in the free state;
moving the stem, the valve body unit, and the replacement ring to an opposite side to the valve seat side using the driving force generated by the driving portion such that the first surface of the replacement ring comes into contact with the second surface of the tubular bonnet and the ring dropping portion of the valve body unit comes into contact with the replacement ring;
moving only the stem to the opposite side to the valve seat side using the driving force generated by the driving portion such that a connection formed by the connecting mechanism between the stem connection portion and the stem is released and then the valve body unit is disengaged from the stem; and
attaching a new valve body unit to the stem by inserting the stem connection portion of the connecting member of the new valve body unit into the connecting hole in the stem.

7. A valve device assembly method for assembling a valve device,
the valve device comprising:
    a valve device body that has a fluid passage and a valve chamber formed therein and includes a valve seat;
    a tubular bonnet that is connected to the valve device body to be capable of approaching the valve seat and separating from the valve seat;
    a driving portion that is configured to generate driving force;
    a stem that is supported by the tubular bonnet and is configured to approach the valve seat and separate from the valve seat upon receipt of the driving force generated by the driving portion to open and close the fluid passage;
    a valve body unit that is connected to the stem and is configured to open and close the fluid passage by approaching the valve seat and separating from the valve seat;
    a replacement ring that is provided in the tubular bonnet; and
    a connecting mechanism that connects the valve body unit to the stem, wherein
a connecting hole that opens toward the valve seat is formed in a part of the stem on a valve seat side, the valve body unit includes:
- a diaphragm that is provided to cover the valve chamber and keeps the valve chamber airtight;
- a valve body portion that is inserted into a central portion of the diaphragm and is configured to open and close the fluid passage by approaching the valve seat and separating from the valve seat;
- a connecting member that includes a stem connection portion connected to the stem and a valve body connection portion connected to the valve body portion, and is inserted into the replacement ring; and
- a retaining adapter configured to compress the diaphragm together with the valve device body, the stem connection portion of the connecting member is inserted into the connecting hole in the stem and connected to the stem by the connecting mechanism, the valve body portion includes a ring dropping portion on an opposite side of the diaphragm to a valve chamber side, the replacement ring is provided on an inner peripheral surface of the tubular bonnet, and a first surface of the replacement ring on a stem side has a dimension that enables contact with a second surface of the tubular bonnet on the valve seat side when the replacement ring is in a free state, a first inclined surface that gradually separates from the valve seat toward an inside thereof is formed on an inner peripheral end of the second surface of the tubular bonnet, and a fitting groove into which the replacement ring is configured to be fitted is formed on an upper side of the first inclined surface of the tubular bonnet, the retaining adapter has a third surface that is configured to contact the second surface and a second inclined surface that is formed on an inner peripheral end of the third surface, inclines relative to an axis of the stem, and gradually approaches the valve seat toward the inside thereof, and the replacement ring includes an outer peripheral portion having an arc-shaped cross-section when cut on a plane that includes an axis thereof, an outer diameter of the replacement ring is set to be smaller than an inner diameter of an end portion of the second inclined surface on the third surface side when the replacement ring is in the free state, and the outer peripheral portion is configured to be capable of contacting the second inclined surface, the valve device assembly method comprising:

bringing the outer peripheral portion of the replacement ring, which is in the free state, into contact with the second inclined surface in a state where the tubular bonnet is separated from the valve seat, causing the tubular bonnet to approach the valve seat such that the replacement ring is compressed between the second surface of the tubular bonnet and the second inclined surface, then causing the replacement ring to decrease in diameter along the second inclined surface until the outer peripheral portion of the replacement ring comes into contact with the first inclined surface, and moving the stem and the valve body unit to the opposite side to the valve seat side using the driving force generated by the driving portion so that the replacement ring moves to the stem side from the ring dropping portion, such that the replacement ring is caused to move along the first inclined surface while decreasing in diameter and the replacement ring is fitted into the fitting groove and then the replacement ring is attached to the tubular bonnet.

8. A valve device comprising:
- a valve device body that has a fluid passage and a valve chamber formed therein and includes a valve seat;
- a tubular bonnet that is detachably provided on the valve device body;
- a driving portion that is configured to generate driving force;
- a stem that is supported by the tubular bonnet and is configured to approach the valve seat and separate from the valve seat upon receipt of the driving force generated by the driving portion to open and close the fluid passage;
- a valve body unit that is connected to the stem and is configured to open and close the fluid passage by approaching the valve seat and separating from the valve seat;
- a connecting mechanism that connects the valve body unit to the stem; and
- a replacement jig that includes a gripping portion and a pair of insertion portions extending from the gripping portion, wherein a connecting hole that opens toward the valve seat is formed in a part of the stem on a valve seat side, the valve body unit includes:
- a diaphragm that is provided to cover the valve chamber and keeps the valve chamber airtight;
- a valve body portion that is inserted into a central portion of the diaphragm and is configured to open and close the fluid passage by approaching the valve seat and separating from the valve seat; and
- a connecting member that includes a stem connection portion connected to the stem and a valve body connection portion connected to the valve body portion, and is inserted into the replacement ring, the stem connection portion of the connecting member is inserted into the connecting hole in the stem and connected to the stem by the connecting mechanism, the valve body unit includes a jig contacting portion on an opposite side of the diaphragm to a valve chamber side, and the valve body unit is configured to be detached from the stem by: detaching the tubular bonnet from the valve device body together with the stem and the valve body unit which are positioned at a top dead center of the tubular bonnet; moving the stem and the valve body unit to a bottom dead center of the tubular bonnet using the driving force generated by the driving means so as to move the jig contacting portion of the valve body portion to a position in which a distance between the jig contacting portion and the tubular bonnet along an axis of the stem is longer than a thickness of the replacement jig; inserting the replacement jig between the jig contacting portion and the tubular bonnet; moving the stem, the valve body unit, and the replacement jig to the top dead center side using the driving force generated by the driving means so that the replacement jig comes into contacts with the tubular bonnet and the jig contacting portion comes into contact with the replacement jig; and in this state, moving only the stem to the opposite side to the valve seat side using the driving force generated by the driving means so that a connection formed between the stem connection portion and the stem by the connecting mechanism is released.

9. A method for replacing valve body unit of valve device, the valve device comprising:
- a valve device body that has a fluid passage and a valve chamber formed therein and includes a valve seat;
- a tubular bonnet that is detachably provided on the valve device body;
- a driving portion that is configured to generate driving force;
- a stem that is supported by the tubular bonnet and is configured to approach the valve seat and separate from the valve seat upon receipt of the driving force generated by the driving portion to open and close the fluid passage;
- a valve body unit that is connected to the stem and is configured to open and close the fluid passage by approaching the valve seat and separating from the valve seat;
- a connecting mechanism that connects the valve body unit to the stem; and
- a replacement jig that includes a gripping portion and a pair of insertion portions extending from the gripping portion, wherein a connecting hole that opens toward the valve seat is formed in a part of the stem on a valve seat side, the valve body unit includes:
- a diaphragm that is provided to cover the valve chamber and keeps the valve chamber airtight;
- a valve body portion that is inserted into a central portion of the diaphragm and is configured to open and close the fluid passage by approaching the valve seat and separating from the valve seat; and
- a connecting member that includes a stem connection portion connected to the stem and a valve body connection portion connected to the valve body portion, and is inserted into the replacement ring, the stem connection portion of the connecting member is inserted into the connecting hole in the stem and connected to the stem by the connecting mechanism, and the valve body unit includes a jig contacting portion on an opposite side of the diaphragm to a valve chamber side, the method comprising:

detaching the tubular bonnet from the valve device body together with the stem and the valve body unit which are positioned at a top dead center of the tubular bonnet;

moving the stem and the valve body unit to a bottom dead center of the tubular bonnet using the driving force generated by the driving means so as to move the jig contacting portion of the valve body portion to a position in which a distance between the jig contacting portion and the tubular bonnet along an axis of the stem is longer than a thickness of the replacement jig;

inserting the replacement jig between the jig contacting portion and the tubular bonnet;

moving the stem, the valve body unit, and the replacement jig to a top dead center side using the driving force generated by the driving means so that the replacement jig comes into contacts with the tubular bonnet and the jig contacting portion comes into contact with the replacement jig;

moving only the stem to the opposite side to the valve seat side using the driving force generated by the driving means so that a connection formed between the stem connection portion and the stem by the connecting mechanism is released and then the valve body unit is detached from the stem; and attaching a new valve body unit to the stem by inserting the stem connection portion of the connecting member of the new valve body unit into the connecting hole in the stem.

\* \* \* \* \*